United States Patent [19]
Bender et al.

[11] Patent Number: 5,920,657
[45] Date of Patent: *Jul. 6, 1999

[54] METHOD OF CREATING A HIGH RESOLUTION STILL IMAGE USING A PLURALITY OF IMAGES AND APPARATUS FOR PRACTICE OF THE METHOD

[75] Inventors: Walter R. Bender, Auburndale, Mass.; Laura A. Teodosio, Derby, Conn.

[73] Assignee: Massachusetts Institute of Technology, Cambridge, Mass.

[ * ] Notice: This patent is subject to a terminal disclaimer.

[21] Appl. No.: 08/907,733

[22] Filed: Aug. 8, 1997

Related U.S. Application Data

[63] Continuation of application No. 07/968,985, Oct. 30, 1992, Pat. No. 5,657,402, which is a continuation-in-part of application No. 07/786,698, Nov. 1, 1991, abandoned.

[51] Int. Cl.[6] ...................................................... G06K 9/36
[52] U.S. Cl. ............................................................ 382/284
[58] Field of Search ..................................... 382/107, 173, 382/263, 268, 278, 294, 284; 348/218, 598, 701, 452, 580, 585, 590, 586

[56] References Cited

U.S. PATENT DOCUMENTS

| 4,404,594 | 9/1983 | Hannan | 348/355 |
|---|---|---|---|
| 4,463,372 | 7/1984 | Bennett et al. | 348/580 |
| 4,584,704 | 4/1986 | Ferren | 382/255 |
| 4,652,909 | 3/1987 | Glenn | 348/262 |
| 4,661,986 | 4/1987 | Adelson | 382/154 |

(List continued on next page.)

OTHER PUBLICATIONS

Burt and Adelson, "Merging Images Through Pattern Decomposition," 1985, pp. 173, 175–181, SPIE, vol. 575 Applications of Digital Image Processing VIII.

Burt and Adelson, "A Multiresolution Spline With Application to Image Mosaics," Oct. 1983, App. 217–236, ACM Transactions on Graphic, vol. 2, No. 4.

(List continued on next page.)

Primary Examiner—Amelia Au
Assistant Examiner—Samir Ahmed
Attorney, Agent, or Firm—Steven J. Weissburg

[57] ABSTRACT

The invention is a method for generating a still image, comprising the steps of producing a plurality of images, each of the plurality having been produced at a distinct focal length, scaling each of the images to a common focal length and combining each of the scaled images to a final image of a single focal length, portions of which are of a relatively high resolution, as compared to the images of the original sequence. The invention also includes combining a sequence of still images of varying fields of view into a panoramic image of an overall field of view, which overall field of view includes all of the fields of view of the sequence. In addition to combining images generated at different fields of view, the method of the invention can be used to combine images generated with respect to different fields of view of an overall scene, such as a panoramic scene into a combined panoramic field of view. This aspect of the invention may also be combined with the varying focal length aspect. Even without varying the focal length or the field of view, the invention can be used to produce a composite image of enhanced resolution relative to the resolution of any of the images of the original sequence. The invention is also an apparatus for generating a still image, comprising means for producing a plurality of images, each of the plurality having been produced at a distinct focal length, the focal lengths differing from each other, means for scaling each of the plurality of images to a common focal length and means for combining each of the scaled images into a single image of a single focal length. The apparatus of the invention also includes apparatus to combine images generated with respect to different fields of view of an overall scene into a combined panoramic field of view.

3 Claims, 11 Drawing Sheets

U.S. PATENT DOCUMENTS

| | | | |
|---|---|---|---|
| 4,731,864 | 3/1988 | Modla | 382/255 |
| 4,797,942 | 1/1989 | Burt | 382/284 |
| 4,876,597 | 10/1989 | Roy | 348/143 |
| 4,928,252 | 5/1990 | Gabbe et al. | 364/519 |
| 4,967,271 | 10/1990 | Campbell et al. | 348/701 |
| 4,969,039 | 11/1990 | Koga | 386/111 |
| 4,991,009 | 2/1991 | Suzuki | 348/415 |
| 5,034,986 | 7/1991 | Karmann et al. | 382/1 |
| 5,040,067 | 8/1991 | Yamazaki | 358/183 |
| 5,067,014 | 11/1991 | Bergen et al. | 382/107 |
| 5,140,416 | 8/1992 | Tinkler | 382/173 |
| 5,144,442 | 9/1992 | Ginosar et al. | 358/209 |
| 5,187,754 | 2/1993 | Currin et al. | 382/284 |
| 5,241,608 | 8/1993 | Fogel | 382/41 |
| 5,258,837 | 11/1993 | Gormley | 358/140 |
| 5,262,856 | 11/1993 | Lippman et al. | 348/415 |
| 5,325,449 | 6/1994 | Burt et al. | 382/56 |
| 5,394,520 | 2/1995 | Hall | 382/278 |
| 5,657,402 | 8/1997 | Bender et al. | 382/284 |

OTHER PUBLICATIONS

Bergen, Anandan, Hanna, and Hingorani, "Hierarchical Model–Based Motion Estimation," Mar. 23, 1992, pp. 1–21, Proc. of European Conference on Computer Vision–92.

Webster's II New Riverside University Dictionary, 1984, p. 83.

Bender et al., "Newspace: Mass Media and Personal Computing," USENIX Conference Proceedings, Nashville, TN, Jun. 1991.

McLean, "Structured Video Coding," Master's Thesis submitted to Mass. Inst. of Technology, dated Jun. 1991, made available to the public in on–line database on Nov. 29, 1991.

Claman, "A Two–Channel Spatio–Temporal Encoder," B.S. MIT Thesis, May 1988.

Bergen, Burt, Hingorani, and Peleg, "Computing Two Motions from Three Frames," David Sarnoff Research Center, Princeton, NJ, Apr. 1990.

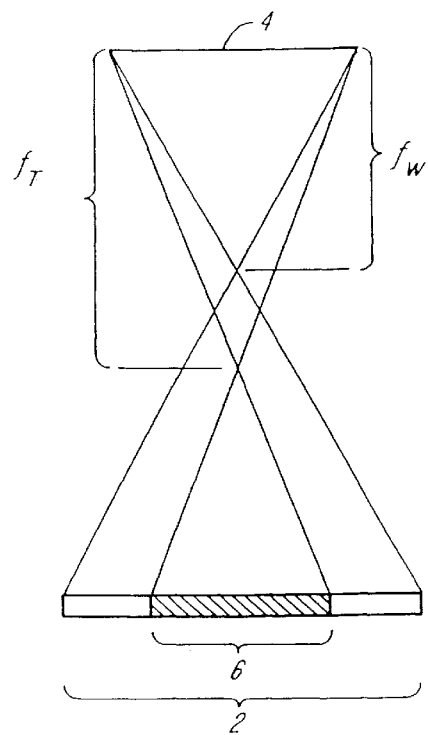
FIG. 1
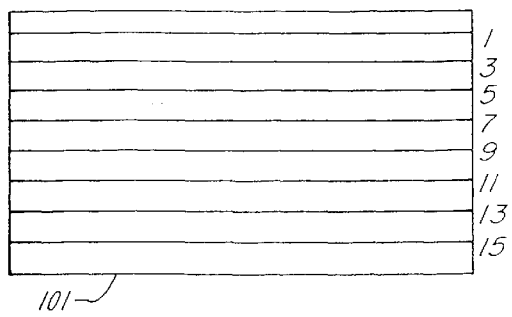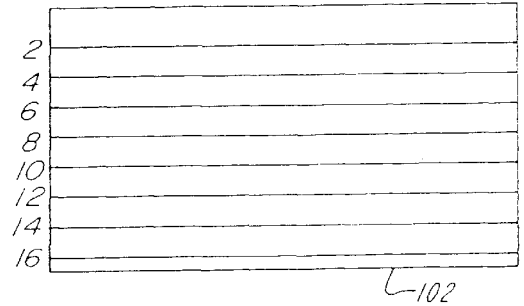
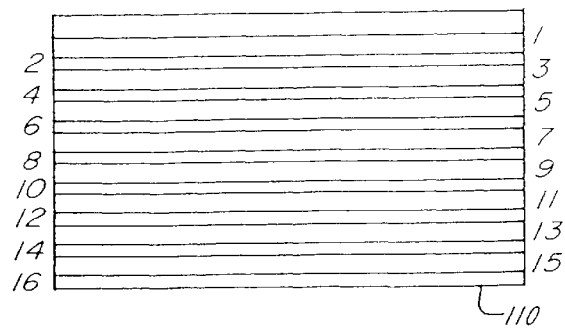
FIG. 2A

METHOD OF CREATING A HIGH RESOLUTION STILL IMAGE USING A PLURALITY OF IMAGES AND APPARATUS FOR PRACTICE OF THE METHOD

RELATED DOCUMENTS

This is a continuation of application Ser. No. 07/968,985 filed on Oct. 30, 1992, now U.S. Pat. No. 5,657,402, which is a continuation in part of commonly owned U.S. Ser. No. 786,698, "Method of Creating a High Resolution Still Image Using a Plurality of Images of Varied Focal Length or Varied Field of View and Apparatus for Practice of the Method," filed on Nov. 1, 1991, now abandoned, in the names of Walter R. Bender and Laura A. Teodosio, and assigned to the Massachusetts Institute of Technology, which is incorporated fully herein by reference.

Background of the Invention

The present invention relates in general to a method for creating a high resolution still image, using a plurality of images and an apparatus therefor. In particular, the invention relates to a method for creating a still high resolution, fixed focal length image, using a plurality of images of various focal lengths, such as a zoom video sequence. The invention also relates to creating a still panoramic image from a plurality of images of a field of view less than that of the still panoramic image. The invention also relates to creating a high resolution still image from a plurality of images of the same scene, taken over a period of time during which some portions of the scene do not change.

In the field of image processing, it is often desirable to create a still image of a scene. In a typical case, the image will be of a certain resolution, which depends on the coarseness of the recording medium and the focal length of the equipment by which the image is captured. Video equipment is now relatively inexpensive and simple enough for many people to use. Video recording equipment has certain advantages over still image rendering, such as still photography. An activated video camera will capture all events within its field of focus, rather than only those that the photographer chooses to capture by operating a shutter. Thus, in fast moving situations, such as sporting events, or unpredictable situations, such as weddings and news stories, it is often beneficial to set up a video camera to be constantly recording, and then choose selected still shots at a later time. Unfortunately, the resolution of even a very good video signal is only on the order of 480 lines per picture height by 640 samples per picture width. (A video signal is, itself, continuous across a scanline. However, for display, it is sampled along the length of a scanline.) This resolution is inadequate for a quality rendering in many cases, particularly if the original image is shot at a relatively short focal length. If the image were to be blown up, it would be relatively blurry. Similarly, other image capturing techniques, such as moving film, involve a specific degree of resolution. Blowing up the image necessarily entails loss of resolution per unit area over the entire scene.

For instance, a scene of a solo instrumentalist on stage in front of a piano, playing to an audience may be desired, showing the audience. If the image capturing device is a video device, the wide angle image showing the audience will be resolved at the video standard mentioned above. The resolution over the entire image is the same. Thus, the rendering of the soloist will be as coarse as the rendering of the rest of the scene. For example, if the soloist takes up a space of one sixteenth of the image, it will be rendered using 120 lines in the vertical direction and 160 samples in the horizontal direction. Less important aspects of the scene, for instance empty chairs in the back row, will be rendered at the same resolution. FIG. 1 shows schematically the focusing of a scene on a focal plane in connection with two different focal lengths. The full width of image 2 is focused on focal plane 4, if the focal length $f_w$ is relatively short.

It is, of course, possible to render the soloist at a higher resolution (ie. a greater number of lines in the vertical direction and more pixels in the horizontal direction), by "zooming in" on the soloist and capturing the image of the soloist at a longer focal length. As shown in FIG. 1, the focal length $f_T$ is longer than $f_w$. However, only the central portion 6 of image 2 is focused on focal plane 4. Much of the scene is lost, because it focuses outside of the scope of the focal plane. The image of the soloist is enlarged to fill more space, and some of the perimeter of the former image is not captured.

It is known to enhance pictorial data by combining two channels of data; a first channel having a high spatial resolution (ie. relatively many picture elements per inch) and a relatively low temporal resolution (ie. relatively few frames per second) and a second channel having a lower spatial resolution and a higher temporal resolution. The resultant combination achieves a spatial and temporal resolution approaching the higher of both, while requiring the transfer of less information than would ordinarily be required to transmit a single image sequence of high temporal and spatial resolutions. See Claman, Lawrence N., *A Two-Channel Spatio-Temporal Encoder*, B. S. Thesis submitted to the Department of Electrical Engineering and Computer Science at The Massachusetts Institute of Technology, May 1988.

The known techniques are not conducive to the task at hand, namely enhancing the resolution of various spatial portions of a still figure beyond that available in the rendering captured at the shortest focal length. The Claman disclosure uses fixed focal length images and vector quantization, and results in a still frame of resolution and field of view no greater than that of the original high spatial resolution images.

A related problem arises in connection with capturing the maximum amount of information available from a scene and generating a signal representative of that information, and later recovering the maximum available amount of information from the signal. It is desireable to be able to provide the highest resolution image possible.

It is also desireable to be able to provide a panoramic view of a scene, maintaining a substantially common focal length from one portion of the panoramic view to another. The known way to do this is to move a video camera from one side of a panoramic scene to another, essentially taking many frames that each differ only slightly from the preceding and following frames. Relative to its adjacent neighbors, each frame differs only in that the left and right edges are different. Most of the image making up the frame is identical to a portion of the image in the neighboring frames. Storage and navigation through these various images that make up a panoramic scene requires a huge amount of data storage and data access. This known technique is undesirable for the obvious reasons that data storage and access are expensive. It is further undesireable, because most of the data stored and accessed is redundant. Image capture devices that are currently used to capture panoramic spaces include a moving glubuscope camera or a volpi lens.

It is also desireable to be able to both pan from one location in a scene to another, and to zoom at the same time.

The drawbacks of known methods certainly create an undesireable situation with respect to such a combination.

OBJECTS OF THE INVENTION

Thus, the several objects of the invention include to provide a method and apparatus for creating a relatively high resolution still image that: does not require capturing information at the high resolution over the range of the entire image; that can produce an image of higher resolution image than any image in a sequence used to compose the high resolution image; that does not require collecting information with respect to large parts of the image that are of only minor interest; that can take as an input a sequence of standard video images of varying focal length or field of view; that can take as an input a sequence of standard film images; that allows enhancing the resolution of any desired portion of the image; and which can be implemented using a properly programmed general purpose digital computer and standard video or movie equipment. It is a further object of the invention to provide a method that facilitates presenting a panoramic view of a scene to an observer, and permits the observer to navigate from one location in the scene to another, without requiring excesseively large data storage and data access capabilities. A further object of the invention is to provide the foregoing capabilities in connection with any form of digitized image data.

BRIEF DESCRIPTION OF THE INVENTION

In a preferred embodiment, the invention is a method for generating a still image, comprising the steps of generating a plurality of signals, each signal representing one of a plurality of images, each of the plurality of images having been produced at a distinct focal length, transforming each signal so that it represents the respective image scaled to a common focal length and combining each of the transformed signals to a resultant signal that represents a combination of the scaled images to a final image of a single focal length, portions of which are of a relatively high resolution, as compared to the images of the original sequence.

In another preferred embodiment the invention is an apparatus for generating a still image, comprising means for producing a plurality of images, each of the plurality having been produced at a distinct focal length, the focal lengths differing from each other, means for generating a plurality of signals, each signal representing one of said plurality of images of distinct focal length, means for transforming each of the plurality of signals so that it represents the respective image scaled to a common focal length and means for combining each of the transformed signals into a resultant signal that represents a combination of the scaled images into a single image of a single focal length.

In another preferred embodiment, the invention is a method for generating a still image, comprising the steps of generating a plurality of signals, each signal representing one of a plurality of images, each of the plurality of images having been produced at a distinct field of view, transforming each signal so that it represents the respective image translated to a position within a common panoramic field of view and combining each of the transformed signals to a resultant signal that represents a combination of the translated images to a final image of a single panoramic field of view, which covers a larger field of view, as compared to the images of the original sequence.

In yet another preferred embodiment the invention is an apparatus for generating a still image, comprising means for producing a plurality of images, each of the plurality having been produced at a distinct field of view, the fields of view differing from each other, means for generating a plurality of signals, each signal representing one of said plurality of images of distinct field of view, means for transforming each of the plurality of signals so that it represents the respective image translated to a position within a common panoramic field of view and means for combining each of the transformed signals into a resultant signal that represents a combination of the translated images into a single image of a single panoramic field of view.

In still another preferred embodiment, the invention is a method for generating a still image, comprising the steps of generating a plurality of signals, each signal representing one of a plurality of images, each of the plurality of images having been produced at a distinct field of view and a distinct focal length, transforming each signal so that it represents the respective image translated to a position within a common panoramic field of view and scaled to a common focal length and combining each of the transformed signals to a resultant signal that represents a combination of the translated and scaled images to a final image of a single panoramic field of view, which covers a larger field of view, as compared to the images of the original sequence and a single focal length, portions of which are of a relatively high resolution, as compared to the images of the original sequence.

In yet another preferred embodiment, the invention is a method for generating a still image, comprising the steps of generating a plurality of signals, each signal representing one of a plurality of images, each of the plurality of images having been produced at a distinct time capturing the image of a portion of the scene, combining each of the signals to a resultant signal that represents a combination of the images to a final image, which includes more information, as compared to any individual image of the original sequence.

Another preferrred embodiment of the invention is an apparatus including means for generating a plurality of signals, each signal representing one of a plurality of images, each of the plurality of images having been produced at a distinct time capturing the image of a portion of a scene means for combining each of the signals to a resultant signal that represents a combination of the images to a final image, which includes more information, as compared to any individual image of the original sequence.

The invention will be more fully understood with reference to the accompanying figures and the following specification.

BRIEF DESCRIPTION OF THE DRAWINGS

FIG. 1 shows schematically the relation between the focal length of an image capturing device and the portion of a scene captured by such a device.

FIG. 2a shows schematically a pair of video fields and a video frame.

FIG. 14b shows schematically a combined panoramic image, made up of the individual images of FIG. 14a.

DETAILED DESCRIPTION OF PREFERRED EMBODIMENTS OF THE INVENTION

Figure 2B:
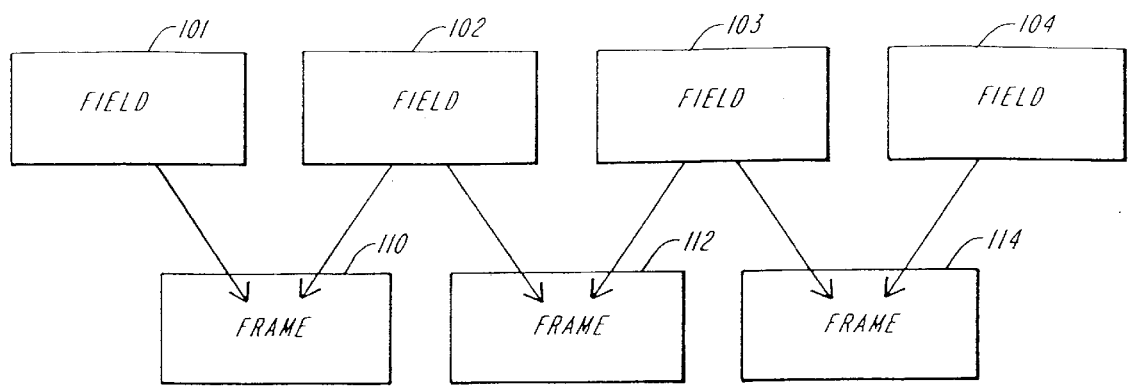
FIG. 2b shows schematically the interlacing of pairs of typical video fields, which together make up video frames.

A typical video image is created by a sequence of fields. Each field represents a still image of a scene to be rendered. There is a vertical displacement of ½ of a scan line between successive fields due to an interlace. (Some display systems are scanned without interlace, in which case there is no vertical displacement between fields.) By displaying a sequence of such still fields at a rate of, typically, 50 or 60 fields per second, the appearance of motion or change is achieved due to psycho-physical aspects of the human visual system. Each pair of fields is made up of a screen full of lines, as discussed above, with each line composed of picture elements (pixels). Each pixel can be represented in a computer memory or other suitable digital recording medium by a signal value in a specified range. For a color image, this range is typically 0–255 for each of three components; for a grayscale image, this range is typically 0–255 for a single component. Some image sources, such as satellite imagery or X-rays might have a range as great as 0–4096. The pixel values are stored in memory in a configuration corresponding in some fashion to their location within the frame.

As is well understood in the art, the pixel values, or data, are represented as electromagnetic signals, that may be stored in computer memory, stored in some magnetic medium, such as tape or disk, or transmitted along data lines. Typically, all of the operations that are performed on the video images are performed on the signals representing the values of the individual pixel elements. It will be understood that, in the following discussions, when operations are mentioned as being performed on "images," or the data representing or corresponding to images,, corresponding operations are actually performed on signals (e.g. electromagnetic signals) that represent the images or data or pixel values. However, for simplicity of discussion, the following specification typically refers to operations as being performed on the images themselves. Those skilled in the art of image processing are versed in the representation of images by such signals. Further, in a preferred embodiment, the operations on such signals are performed by a suitable programmed general purpose digital computer. However, certain of the operations or signal manipulations can be performed by equipment specifically constructed for the particular process at hand. Implementation of such equipment is within the competence of one of ordinary skill in the art.

In the case of black and white recordings of images, each pixel element is a single, discrete element. In the case of color recordings, a set of channels, or groups of pixels is used for each picture element. For instance, in a color value scheme known as RGB, each color is represented by a combination of amounts of the colors red (R), green (G) and blue (B). A separate color "channel" for each of these three colors is provided. In the RGB system, each channel has the same number of pixels per scanline and scanlines per screen. Other color value systems, discussed below, have a different number of samples per scanline for different channels. The pixel elements are typically located adjacent each other on the display device, so that when they are displayed simultaneously (as observed by the observer), they combine to form the colors of the original image. Other schemes, such as time sequential display of pixels, are possible.

The RGB color value scheme is useful for certain applications, but it is not the most convenient for mathematical manipulation of color values. Other color schemes are more useful, typically those which include a channel representing the luminance values of the image. Luminance is generally described as the intensity of light emitted by or reflected from a surface in a given direction per unit of apparent area. In general, a three channel color space defined by luminance and two other dimensions is equivalent to the RGB color space. A typical luminance color space is the Y (luminance), i (in phase) q (quadrature) color space used by the National Television Standards Committee for television broadcast in the United States. Other luminance color spaces include the Commission International de l'Edairage (CIE), Y, x, y (luminance and two chrominance channels), and its variants, and Y, u, v (also luminance and two chrominance channels) and many more.

In the context of the present invention, it is sufficient to do most of the processing on the signal representing a single channel or component. All of the calculations and manipulation of data are first performed only on the Y channel of a color image. The Y channel is chosen since it usually has the highest signal to noise ratio in a video system, and because it is usually sampled at a higher spatial frequency than chrominance. After the necessary transformations are determined with respect to the Y channel, the same transformations are applied to the remaining channels, such as the chrominance channels in phase and quadrature. The nature of these transformations will be explained in the following sections.

While video images are commonly regarded as a series of frames, in fact, no such thing as a "frame" exists on the screen at any one time. What is regarded by a human observer and those skilled in the art as a frame is, in reality, a pair of "fields." Each field is made up of either the even numbered scanlines or the odd numbered scanlines. The even fields are offset one-half of a scanline in the vertical direction from the odd scanlines. A pair of fields is interlaced to make up a frame.

A pair of fields 101, 102 is shown schematically in FIG. 2a. Field 101 contains only the odd scanlines of the image, and field 102 contains only the even scanlines of the image. The video device records the fields separately, one after the other. Thus, each field potentially records a slightly different image, depending on the motion of the scene or the camera, relative to the time period between recording of the fields. The video device also displays the fields one after another in rapid succession, typically at a rate of 50 or 60 fields per second. When the fields are displayed at this rate, a human observer "sees" the fields combined to form a frame, as shown at 110. It will be understood that each field (except for the first and the last in a sequence) is a component of each of two successive frames. As shown in FIG. 2b, field 102 makes up the second field of frame 110, and the first field of frame 112. Similarly, field 103 makes up the second field of frame 112 and the first field of frame 114. It will also be understood that, except as combined by the human observer, frames do not really exist as a discrete signal element.

The method of the invention uses a sequence of frames, typically of a video image. In order to practice the invention, it is necessary to "de-interlace" the components of a frame. By "de-interlace," it is meant to compose a signal representing an actual frame of pixel elements, typically in computer memory only, which include pixel values for every line of an image, rather than just the odd or even numbered lines. The invention is also applicable to data recorded without the technique of interlacing. However, because interlaced material is common, it is necessary to be able to de-interlace it.

According to the present invention, de-interlacing is accomplished by applying a median filter to the data signal. For example, to create the seventh scanline of a de-interlaced frame at time t, the median of four values is taken: the value for each pixel element in line numbered 7 of the field at time t−1; the value of the corresponding pixel element in line numbered 7 of the field at time t+1; the value of the corresponding pixel in the line numbered 6 of the field at time t; and the value of the corresponding pixel in line numbered 8 of the field at time t. The median among these four numbers is assigned as the value of the corresponding pixel element in the seventh line of the frame of the de-interlaced sequence.

The same process is repeated for every pixel in the scanline and for every odd numbered scanline in the field. The even numbered scanlines are simply taken from the field at time t. It should be pointed out that this de-interlaced frame will not be the same as any "frame" of the original sequence, since the pixel elements making up the odd numbered scanlines will have been created from a combination of the preceding and succeeding fields and the field at time t.

To create the second de-interlaced frame, the process is repeated, except that the even scanlines are formed by taking a median among even scanlines from fields t and t+2 and the odd numbered scanlines from field t+1 above and below the scanline in question. The odd scanlines are picked directly from the field at t+1.

After the frames are de-interlaced, the result is a series of frames, each composed of a full complement of even numbered and odd numbered scanlines, with the same number of scanlines as in a frame perceived by a human observer observing a sequence of fields.

Other methods of de-interlacing are also possible and are within the contemplation of the invention. However, these other methods are not considered to provide results as good as the technique discussed above. One method is to perform a linear interpolation between scanlines in each field in order to synthesize a new line of data between each pair of lines in a field. This technique results in a loss of apparent spatial resolution in parts of the image where there is no motion. Yet another method would be to interpolate between the fields preceding and following the current field. This technique results in a loss of temporal resolution in parts of the image where there is motion. It is also possible to perform the data manipulations on the separated fields and use affine transformations to warp one field into the next. However, affine transformations on fields will not provide as good results as affine transformations on de-interlaced frames due to spatial temporal aliasing due to the interlace.

The sequence of frames that is used in one embodiment of the method of the invention is typically a zoom sequence, zooming either from a higher to a lower focal length, or vice versa. It is also possible to pan (horizontal motion) or jib (vertical motion) or tilt during the course of the zoom. Further, each of the pan, jib or tilt can be employed without a zoom. In addition, an embodiment of the invention relates to combining information from a sequence of images all captured at substantially the same focal length, i.e. without any zoom, and over substantially the same field of view, i.e. without any significant pan or jib or tilt. For ease of discussion, the pure zoom embodiment is discussed in detail, with the remaining embodiments discussed in less detail following.

Figure 3:
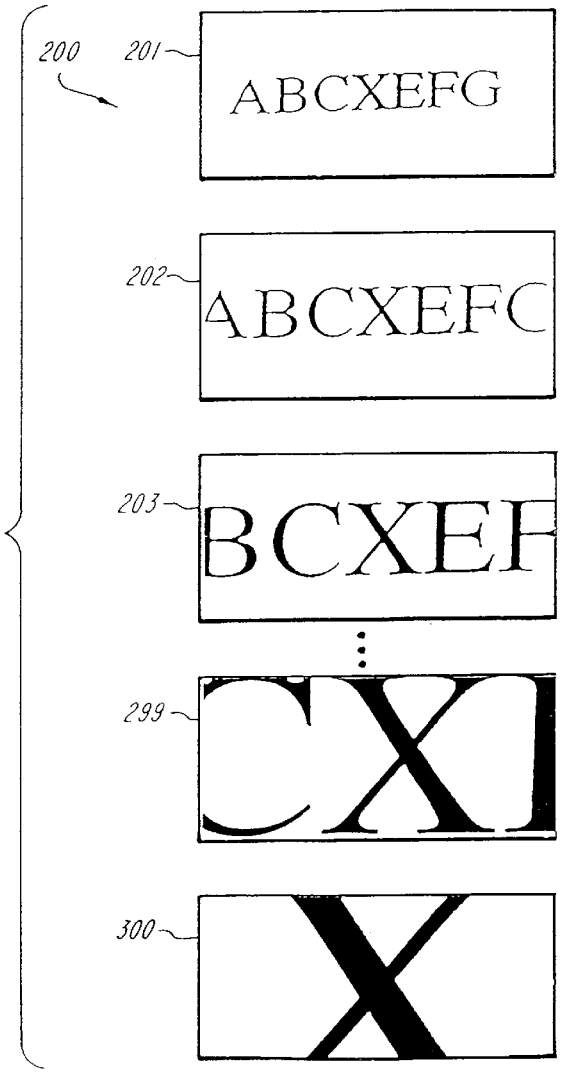
FIG. 3 shows schematically a sequence of video frames of substantially the same scene, zooming in from a short focal length to a relatively longer focal length.

A sequence 200 of one hundred de-interlaced frames is shown schematically in FIG. 3. The sequence consists of a zoom from a relatively short focal length wide angle frame 201 to a relatively long focal length close up frame 300. In frame 201, a string of letters is represented schematically. In frame 300, only a portion of the letter "X" located at the center of frame 201 is included in the frame.

Each frame of sequence 200 is made up by the same number of pixel elements and scanlines. Thus, assuming that the cross of the central letter X takes up fifty pixels in the zoom of frame 201, the cross may take up three hundred pixels in the zoom of frame 300. A typical zoom results in a scaling factor of more than 4:1 from first to last frames of the sequence. Obviously, much more information is available for rendering the cross from the zoom of frame 300, than is available from the zoom of frame 201. However, none of the information necessary to render other aspects of the initial scene, for instance the other letters, is available from frame 300, since those aspects are not present. It is an object of the invention to combine the information available from separate frames of the sequence into a composite image, having a high degree of information for large portions of the scene.

Figure 4:
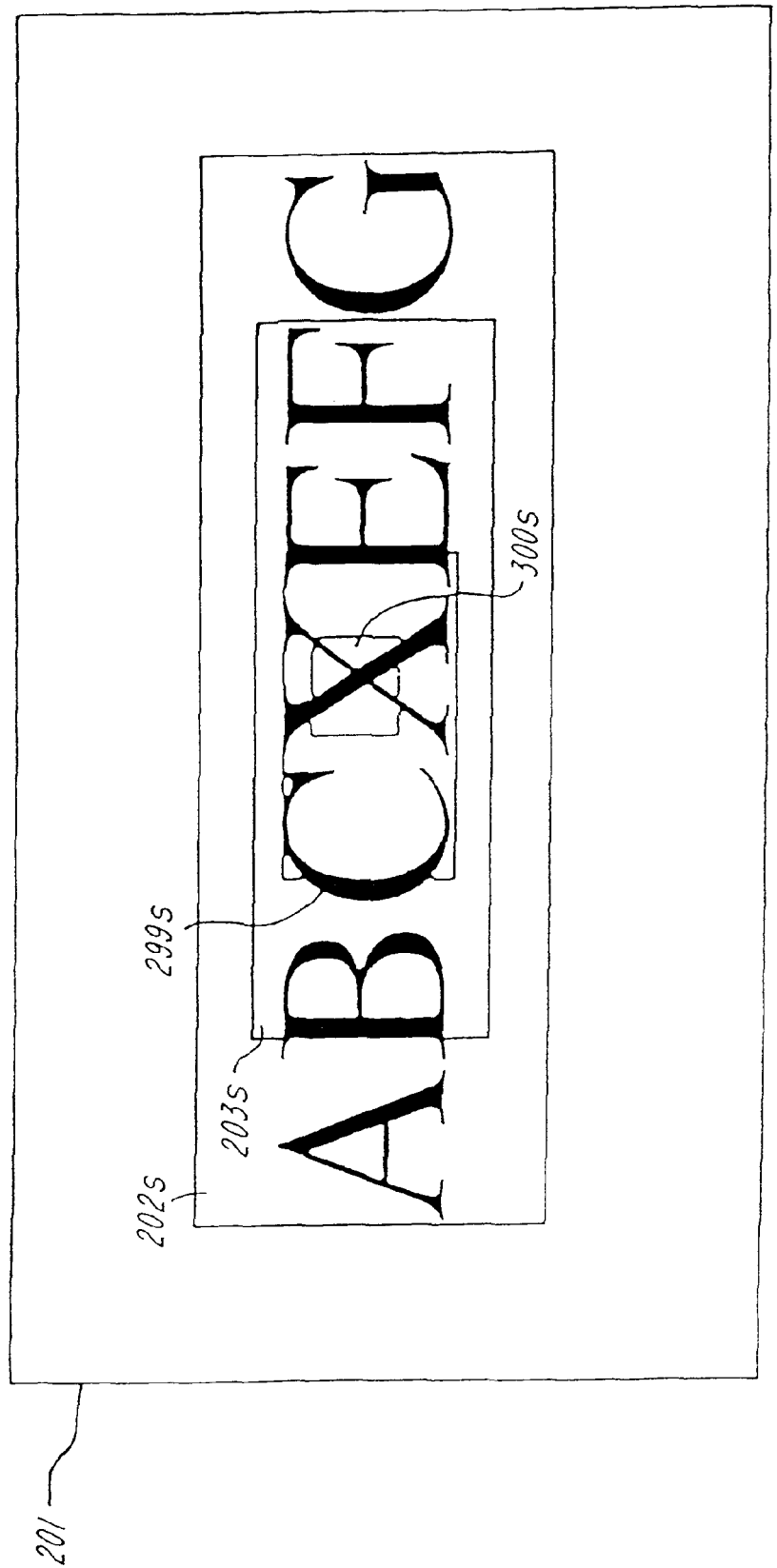
FIG. 4 shows schematically the portions of the scene in the video frame of shortest focal length (widest angle field of view), that are rendered in the remaining members of the sequence of frames of progressively longer focal lengths.

The relationship between the individual frames and the original scene is shown schematically in FIG. 4. Frame 201 renders the entire original scene. Frame 202 renders only so much of the original scene as would fit inside region 202s, which is smaller than 201. Frame 203 renders only so much of the original scene as would fit inside region 203s, and so on, down to region 300s. Thus, progressively smaller portions of the original scene are mapped into a data space the same size as the data space into which the entire scene is mapped by virtue of zoom 201. (This data space is referred to as the "small" data space, because, compared to the other data spaces involved in the method, it is the smallest.)

It is the object of the invention to use as much information as is available from each of the zoom frames. Each of the zoom frames is blown up so that they are all at the same scale as the frame of longest focal length, ie. frame 299. The blown up frames are laid on top of each other, in the configuration shown schematically in FIG. 5. The original frame 201 is blown up to many times its original size. Each successive frame 202, 203, etc., is blown up a slightly lesser degree, with the final frame 299 not being blown up at all. It is possible to place each frame "on top" of each other, such that the images on each frame are substantially in register with the same portion of the scene of all of the other frames. If the image portion of each frame were opaque, then the visible portions of the scene (consisting of the entire frame 299 and the perimeters of all of the other frames) would be made up of the available frame having the highest resolution.

The scaling up of each frame is accomplished by transforming the data signal representing each frame and then mapping the transformed data into a series of data spaces, ultimately generating a signal that represents the data mapped into a final data space. This final data space is much larger than the small data space and is therefore referred to as the "large" data space. (In practice, in one embodiment, each frame is composed in the entire large data space, so that it occupies the same amount of data space as the full blow-up of frame 201. However, for all of the frames, except frame 201, the perimeter of the frame is made up of pixels having a value of zero. If memory considerations are important, it is also possible to use a less memory intensive mode of combination, as explained below.)

Of course, the resolution of each blown-up frame differs, so the detail of information available for a given portion, e.g. the central letter X from frame 201, will be much less than the detail available for the same portion of the scene derived from frame 203 or frame 299. In other words, the enlarged image from frame 201 suffers from information gaps between pixels. The image from frame 300 does not suffer from these gaps. The information gap is filled in by interpolating between pixels for which data is available, as is discussed below.

As is mentioned above, if the frames are all scaled to the same size and the data for each is "stacked" on top of the data for the others, they are in register, but only substantially in register, not necessarily exactly in register. This is due to motion of the camera and elements in the scene. It is also necessary to take account of these motions in the course of using the sequence of frames to create a relatively high resolution still image.

The method of the invention will now be described in detail. In order to achieve a specific implementation of the above scheme, the method of the invention first maps or "warps" each frame into a data space of the same dimensions (the large data space). After the warping, the individual frames of the sequence are combined by a weighted temporal median operation, to produce the composite figure.

In order to map, or warp each frame into the large data space, the series of frames of the zoom are modelled as a series of frames of substantially constant focal length, recording one or two moving objects. The situations are reciprocal. Rather than treating the focal length of the recording apparatus as changing, the same change in recorded data would arise if the entire scene were moving toward or away from a recording device of a fixed focal length lens.

The following discussion first introduces the basic steps of the method of the invention. The order in which the basic steps are initially discussed has been chosen for explanatory purposes and is not the order in which the steps are performed. That order is discussed after the basic concepts are introduced.

The basic step of the invention is to recover camera motion, in this instance due to zoom, but also due to panning, jibbing, tilting, etc. The method of the invention models the change between successive frames due to camera zoom (or other motion) as a velocity of portions of the image in the horizontal, vertical and scale (perpendicular to the horizontal/vertical plane) directions. The velocity between frames for such image portions is determined in each of these three directions. Consequently, the value for any pixel in any frame can be warped to a corresponding location in a frame of a different focal length by applying multiple velocities (representing motion between multiple successive pairs of frames) to the data representing the original image portion. A relevant technique is described in Bergen, J., Burt, P., Hingorani, R., and Peleg, S., *Computing Two Motions from Three Frames*, David Sarnoff Research Center, Princeton, N.J., April, 1990, which is incorporated fully herein by reference. Much of the following basic discussion is taken substantially from Bergen et al.

A simple closed form estimate for the motion of an image region is derived by Bergen et al. It is assumed at first that small displacements only of portions of the image occur between frames $I(x,y,t-1)$ and $I(x,y,t)$ of an image sequence. Here, $I(x,y,t)$ is the observed image extending in the x (horizontal) and y (vertical) directions at time t, for instance as shown in frame 299. $I(x,y,t-1)$ is the observed image at time t−1, for instance at frame 298. At any time, the pattern in x and y, represented as $P(x,y)$ is moving with a velocity $p(x,y)$, which is a velocity field of every pixel, having a motion component in both of the x and y directions. The motion field $p(x,y)$ can be represented by displacements in x and y:

$$p(xy)=(p_x(x,y), p_y(x,y)) \tag{1}$$

where $p_x(xy)$ is the displacement in the x direction (a function of x and y) and $p_y(x,y)$ is the displacement in the y direction (a function of x and y). Thus, it can be written:

$$I(x,y,t)=P(x-tp_x,y-tp_y) \tag{2}$$

$$I(x,y,t)=I(x-p_x,y-P_y,t-1) \tag{3}$$

Notation can be simplified by letting the frame interval be one unit of time. In accordance with the technique of least squared error, it is beneficial to find the motion field $p=(p_x, p_y)$ that minimizes the squared error between the measured values and the values computed using the field, p.

$$Err = \sum_{x,y \in R} (I(x, y, t) - I(x - p_x, y - p_y, t - 1))^2 \tag{4}$$

Assuming that the displacement is small from one frame to the next, equation (4) can be simplified through a truncated Taylor series expansion of $I(x,y,t)$:

$$I(x-P_x,y-p_y,t-1) \approx I(x,y,t)-p_xI_x(x,y,t)-p_yI_y(x,y,t)-I_t(x,y,t) \tag{5}$$

where $$I_x = \frac{\partial I(x, y, t)}{\partial x}, I_y = \frac{\partial I(x, y, t)}{\partial y}, I_t = \frac{\partial I(x, y, t)}{\partial t}. \tag{6}$$

Consequently

-continued $$Err = \sum_{x,y \in R} (I_t + p_x I_x + p_y I_y)^2.$$

The image motion is obtained by setting the derivatives of equation (6) with respect to each of the parameters of the velocity components (x,y and t) to zero (because the error is at a minimum when the derivatives equal zero) and solving the resulting system of equations.

If the motion of the image portion is modeled by a simple translation: p=($a_x$, $a_y$), where $a_x$ and $a_y$ are constants, in units of pixels, then the optical flow equations are obtained as follows:

$$[\Sigma I_x^2]a_x + [\Sigma I_x I_y]a_y = -\Sigma I_x I_t \quad (7)$$

$$[\Sigma I_x I_y]a_x + [\Sigma I_y^2]a_y = -\Sigma I_y I_t. \quad (8)$$

It will be understood, that in a typical case of implementation of the method of the invention, the motion can not be modelled by a simple translation because simple translation does not facilitate recovery or modelling of scale changes such as occur in a zoom of focal length. The motion of the image is more typically accurately modeled instead as an affine transformation, ie. a transformation that transforms straight lines into straight lines, parallel lines into parallel lines, but may alter distance between points and angles between lines. In this case, the motion field p has six parameters, $a_x$, $b_x$, $c_x$, $a_y$, $b_y$, $c_y$, applied as follows:

$$p_x(x,y)=a_x+b_x x+c_x y \quad (9x)$$

$$p_y(x,y)=a_y+b_y x+c_y y \quad (9y)$$

Where $a_x$ and $a_y$ are as above, $b_x$ is a percentage scaling factor for x in the x direction and $c_x$ is a percentage rotation factor for x, depending on the y location. $b_y$ is a percentage rotation factor for y depending on the x location and $c_y$ is a percentage scaling factor for y. The usual range for $a_x$ and $a_y$ from one frame to the next in a zoom is on the order of a few pixels. The usual range for the remaining factors is on the order of between 0.001 and 0.1. If the error in Equation (6) is differentiated with respect to each of these six parameters, a system of six equations with six unknowns, $a_x$, $b_x$, $c_x$, $a_y$, $b_y$, $c_y$, is obtained.

$$\begin{bmatrix} \Sigma I_x^2 & \Sigma x I_x^2 & \Sigma y I_x^2 & \Sigma I_x I_y & \Sigma x I_x I_y & \Sigma y I_x I_y \\ \Sigma x I_x^2 & \Sigma x^2 I_x^2 & \Sigma x y I_x^2 & \Sigma x I_x I_y & \Sigma x^2 I_x I_y & \Sigma x y I_x I_y \\ \Sigma I_x^2 y & \Sigma x y I_x^2 & \Sigma y^2 I_x^2 & \Sigma y I_x I_y & \Sigma x y I_x I_y & \Sigma y^2 I_x I_y \\ \Sigma I_x I_y & \Sigma x I_x I_y & \Sigma y I_x I_y & \Sigma I_y^2 & \Sigma x I_y^2 & \Sigma y I_y^2 \\ \Sigma x I_x I_y & \Sigma x^2 I_x I_y & \Sigma x y I_x I_y & \Sigma x I_y^2 & \Sigma x^2 I_y^2 & \Sigma x y I_y^2 \\ \Sigma y I_x I_y & \Sigma x y I_x I_y & \Sigma y^2 I_x I_y & \Sigma y I_y^2 & \Sigma x y I_y^2 & \Sigma y^2 I_y^2 \end{bmatrix} \begin{bmatrix} a_x \\ b_x \\ c_x \\ a_y \\ b_y \\ c_y \end{bmatrix} = \quad (10)$$

$$-\begin{bmatrix} \Sigma I_x I_t \\ \Sigma x I_x I_t \\ \Sigma y I_x I_t \\ \Sigma I_y I_t \\ \Sigma x I_y I_t \\ \Sigma y I_y I_t \end{bmatrix}$$

This system must be solved for the coefficients $a_x$, $b_x$, $c_x$, $a_y$, $b_y$, $c_y$. Solution is possible because $I_x$, $I_y$, and $I_t$, the partial derivatives of the image with respect to x, y and t, can be determined from the image values at time t and time t+1. $I_t$ is determined by subtracting the pixel values at time t+1 from the corresponding pixel values at time t. $I_x$ is determined by adding together the corresponding pixel values from time t and t+1 and then running the sum through a derivative filter in x. $I_y$ is determined by running the resultant sum through a derivative filter in y. Once these three values have been determined for every pixel in the image, the system of equations (10) can be solved for coefficients $a_x$, $b_x$, $c_x$, $a_y$, $b_y$, $c_y$. Knowing these coefficients, it is then possible to determine the change in location of a given pixel value, representing a specific aspect of the image, from one frame to the next.

Figure 6:
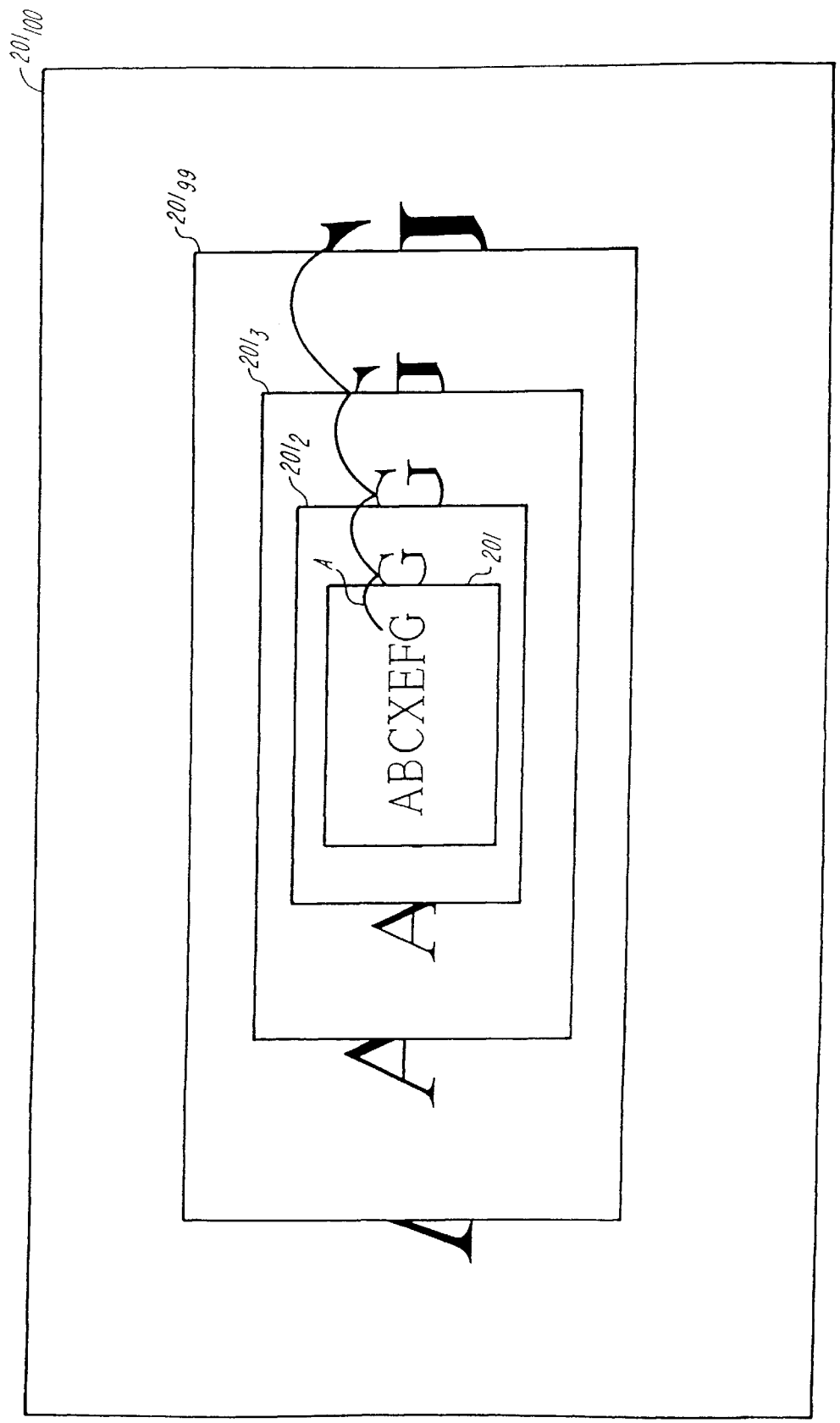
FIG. 6 shows schematically the warping of a single frame, originally recorded at a relatively short focal length, into data spaces relating to successively larger enlargements of the scene.

Thus, in order to determine the locations of pixel values from frame 201, after frame 201 had been warped one step to make portions of the image coincide with corresponding portions of the image in unwarped frame 202, the transformations of equations 9x and 9y are applied to the value of each pixel of frame 201. As shown in FIG. 6, consider the portion of the image at point (x, y), pixel location (20, 30). (FIG. 6 is not to scale.) In FIG. 6, frame 201 at its original scale is identified by reference numeral 201. Frame 201, after having been warped to the scale of frame 202, is identified by reference numeral $201_2$. After having been warped to the scale of frame 203, it is identified by reference numeral $201_3$ and so on, out to $201_{99}$. For a scale increase of 10% (which is large for one frame to the next) and a pan to the right of 5 pixels, typical coefficients between frame 201 and frame 202 have the following values:

$$\begin{bmatrix} a_x \\ b_x \\ c_x \\ a_y \\ b_y \\ c_y \end{bmatrix} = \begin{bmatrix} 5 \\ .1 \\ 0 \\ 0 \\ 0 \\ .1 \end{bmatrix}.$$

Then the displacement from frame 201 to frame $201_2$ in the x direction of the value at pixel (20, 30) in frame 201 will be 5+(0.1×20)+(0×30)=7. That value will move 7 pixels in the positive x direction to x location 27. The displacement in the y direction will be 0+(0×20)+(0.1×30)=3 pixels to y location 33. This is shown schematically in FIG. 6 by the curved arrow A pointing from pixel location (x, y) in frame 201 to another location (at the same spot in the image) in frame $201_2$.

Similarly, to warp the same pixel value into the location it would occupy in frame $201_3$, it is necessary to apply the transformation equations (9x) and ($9_y$) to the pixel coordinates in frame $201_2$, using the coefficients $a_x$, $b_x$, $c_x$, $a_y$, $b_y$, $c_y$ obtained by solving the set of six equations (10) between frames 202 and 203. Those coefficients may be different from what was obtained between frames 201 and 202.

The transformation equations are linear and thus reversible. To transform from the scale of frame 201 to the scale of frame 202, the coefficients $a_x$, $b_x$, $c_x$, $a_y$, $b_y$, $c_y$ are used. To transform from the scale of frame 202 to the scale of frame 201, the linear inverse of these coefficients are used. Transformation in this direction is conducted to implement another mode of combining the image signals, when memory use is desired to be minimized, as explained below.

As has been explained, the pixel value from point (x, y) of frame 201 is warped to a new location in frame $201_2$. The pixel value from point (x+1,y) is also warped to a new location in frame $201_2$ and that location is typically not adjacent to the warped location for the value for pixel (x, y).

If nothing more were done, the spaces between these two points in frame $201_2$ would be blank, or without values. To fill in these spaces with information, some form of interpolation must be performed. Various techniques are possible, including linear and bilinear interpolation. Bilinear interpolation has been used effectively.

Figure 7:
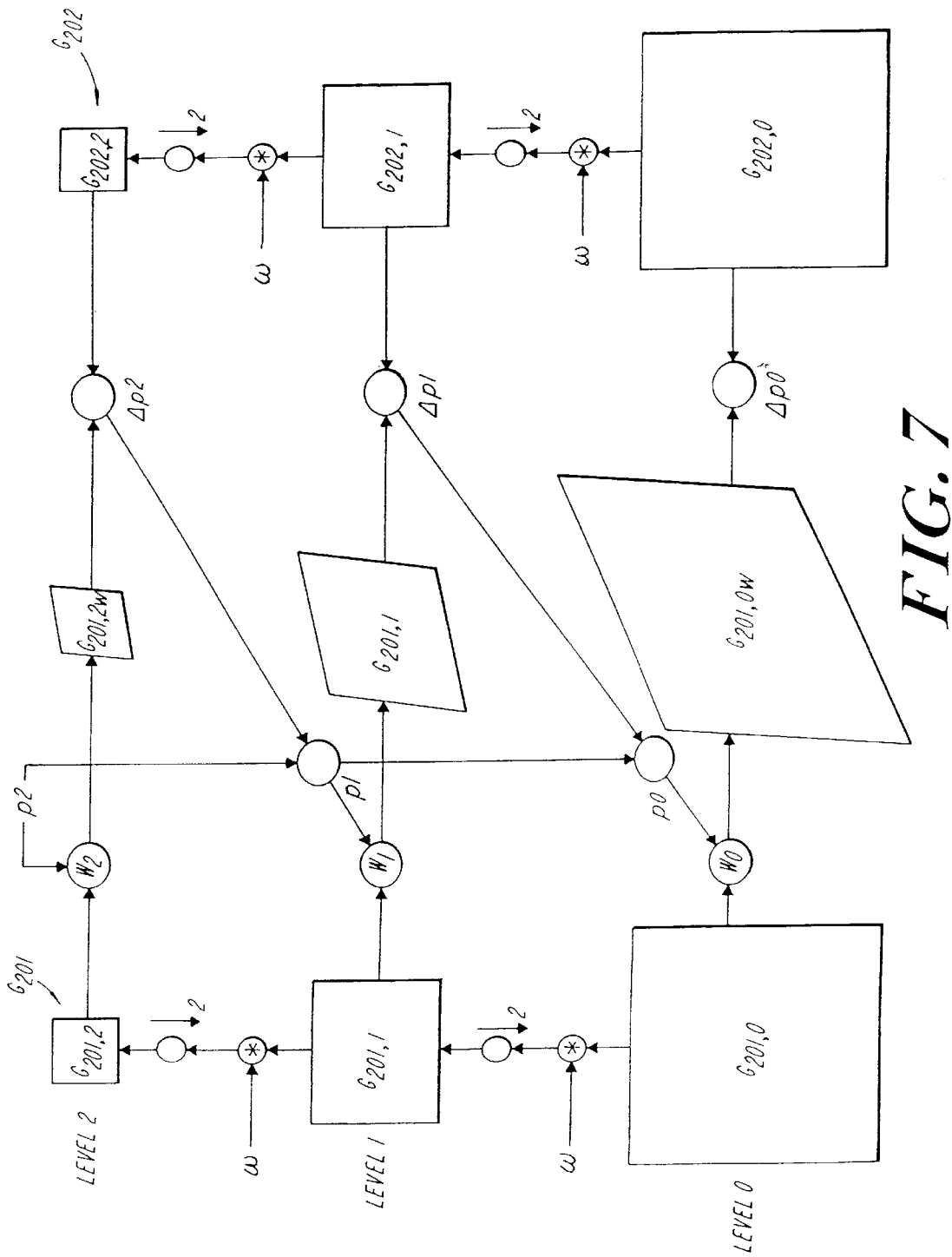
FIG. 7 shows schematically a method for identifying both coarse and fine motion between frames in a sequence.

As is explained by Bergen, Burt et al., the foregoing method of estimating motion works accurately only when the displacement of the image from one frame to the next in the zoom sequence is small (on the order of only a fraction of a pixel), so that the truncated Taylor series approximation is appropriate. Better results are obtained and the technique can be applied to a more general case of large displacements by using a multiresolution (pyramid) structure, as shown schematically in FIG. 7.

In the course of determining the affine transformation parameters, ax, $b_x$, $c_x$, $a_y$, $b_y$, $c_y$, a Gaussian pyramid G is constructed for each frame of a pair of image frames, e.g. frame 201 and 202. The pyramid is formed by a sequence of modified copies of the original image in which, for each member of the sequence, the resolution and the sample density are reduced by a power of 2. It should be noted that the members of the Gaussian pyramid sequence, e.g. $G_{201,0}$, $G_{201,1}$, $G_{201,2}$, $G_{201,1}$, etc, are not at all the same as the members of sequence 200, except to the extent that one of the frames of sequence 200 makes up the base level of the Gaussian pyramid sequence.

To decrease the resolution, the data is passed through a low pass filter. A pass through the low pass filter removes data relating to small or quickly moving aspects of the image. Thus, relatively large motions can be detected at the level of greatest reduction in resolution. Because the low pass filter removes much of the variation in the data, it is not necessary to perform calculations on every pixel present. Thus, sub-sampling by an order of two is applied to reduce the number of pixels upon which the operations will be performed. The subsampling increases computational efficiency, and thus the speed of the operation. A typical pattern of subsampling is to discard every other row and column.

Each level, |, of the pyramid is obtained by convolving the data for the preceding level with a small kernel filter, ω, to effect the low pass filtering, followed by subsampling. $G_{t,l}=[G_{t,l-1}* \omega]\downarrow_2$ where $G_{t,1}$ is the |th pyramid level for image I(x,y,t). The $\downarrow_2$ indicates that the quantity in brackets has been subsampled by 2 in both x and y. For instance, to obtain $G_{201,1}$, $G_{201,0}$, is convolved with filter ω and the resultant is subsampled.

Analysis of the transformation begins at a low resolution level of the image pyramid, for instance level three. Typically for an original image defined by 480 scanlines by 640 pixels, analysis at level three provides good results. The sample distance at level | is $2^l$ times the sample distance of the original image. Thus, correspondingly larger image velocities can be estimated. At each successive iteration of the tracking procedure, analysis moves to the next higher resolution pyramid level, moving closer to the original.

Thus, determination of the affine transformation parameters begins, for example, at level 2. First, it is necessary to solve equations (10) for $a_x$, $b_x$, $c_x$, $a_y$, $b_y$, $c_y$ between pyramid $G_{201}$ and pyramid $G_{202}$. This is done in two steps. At first, a seed set of affine transformations p2 is selected. The seed can be all zeros, or it can be chosen to approximate known aspects of the transformation, such as the scaling factor due to the zoom or translation due to a known pan or jib. These affine transformations are applied at $W_2$ to $G_{201,2}$, to obtain a warped image at level 2, signified in FIG. 7 by the skewed rectangle $G_{201,2w}$. In most cases, this warp will not exactly provide the Gaussian member at the next time interval t+1, ie. $G_{202,2}$. Therefore, in the second step, a set of adjustment affine parameters, $\Delta p_2$ is estimated between the values of image $G_{202,2}$ and $G_{201,2w}$. These are estimated as has been demonstrated above.

It is first necessary to solve for $I_x$, $I_y$, and $I_t$, as has been discussed above for the frame without low pass filtering and without subsampling. $I_x$, $I_y$, and $I_t$ are calculated in the same way, except that the smaller, low pass filtered, subsampled sets of data are used. Rather than subtracting the values for frame 201 from frame 202, the values from warped pyramid frame $G_{201,2w}$, are subtracted from the values for pyramid frame $G_{202,2}$. In this fashion, the partial derivatives for level 2 are determined, and then the adjustment affine parameters $a_x$, $b_x$, $c_x$, $a_y$, $b_y$, $c_y$ for this level can be determined. The adjustment affine parameters are identified collectively in FIG. 7 as Δp2.

This set of adjustment affine parameters is combined with the affine parameters p2 from the preceding level in the Gaussian sequence pyramid 201 to form the affine parameters for level |, i.e. p1. The combination is not a simple addition. The new $a_x$ term, for example, will be based on: the $a_x$ term at time t (pyramid $G_{202}$); the $a_x$ term at time t−1 (pyramid $G_{201}$); and the other changes in the x direction. The following describes the relation:

$$a_x(\text{new})=a_x(t)+a_x(t-1)+c_x(t-1)a_y(t)+b_x(t-1)a_x(t).$$

The process is repeated, this time at level 1, and up through the levels, until the affine transformation parameters $a_x$, $b_x$, $c_x$, $a_y$, $b_y$, $c_y$ are obtained at the original level, in operation on frames 201 and 202. As the affine parameters converge upon the most accurate, the Δp1 terms tend to zero.

Thus, to determine the warp factor to transform a frame from the scale of any frame, e.g. frame 226 to the scale of the next frame, 227, the foregoing operation is conducted. Thus, for each pair of frame scales, a set of affine transformation parameters $a_x$, $b_x$, $c_x$, $a_y$, $b_y$, $c_y$ is computed. Then, to transform a frame, e.g. 251 to the appropriate size, it is first transformed up to the scale of frame 252, using the affine transformation parameters $a_x$, $b_x$, $c_x$, $a_y$, $b_y$, $c_y$ determined by the foregoing analysis on frames 251 and 252. That transformed frame, $251_2$ is next transformed up to the scale of frame 253, by using the affine transformation parameters $a_x$, $b_x$, $c_x$, $a_y$, $b_y$, $c_y$ determined by the foregoing analysis on frames 252 and 253, which are different from the transformation parameters determined between frames 251 and 252. The process is repeated, until the frame has been transformed into the large data space, at the scale of frame 300.

The foregoing method works well if there is little or no relative motion between the camera or the subject (to which either might contribute) and the only image changes are due to zooming. However, in practice, it is beneficial to be able to eliminate the effects of such motions. Several possible methods are available. A rudimentary, but effective method, is to examine all of the frames visually, and identify any gross motion, such as a person walking across the field of view. A mask can be prepared to cover the region where the motion occurs in each frame, and that region is ignored in the transformations. The operator manually selects the pixel values desired to take up the location of the mask in the final picture.

Figure 8:
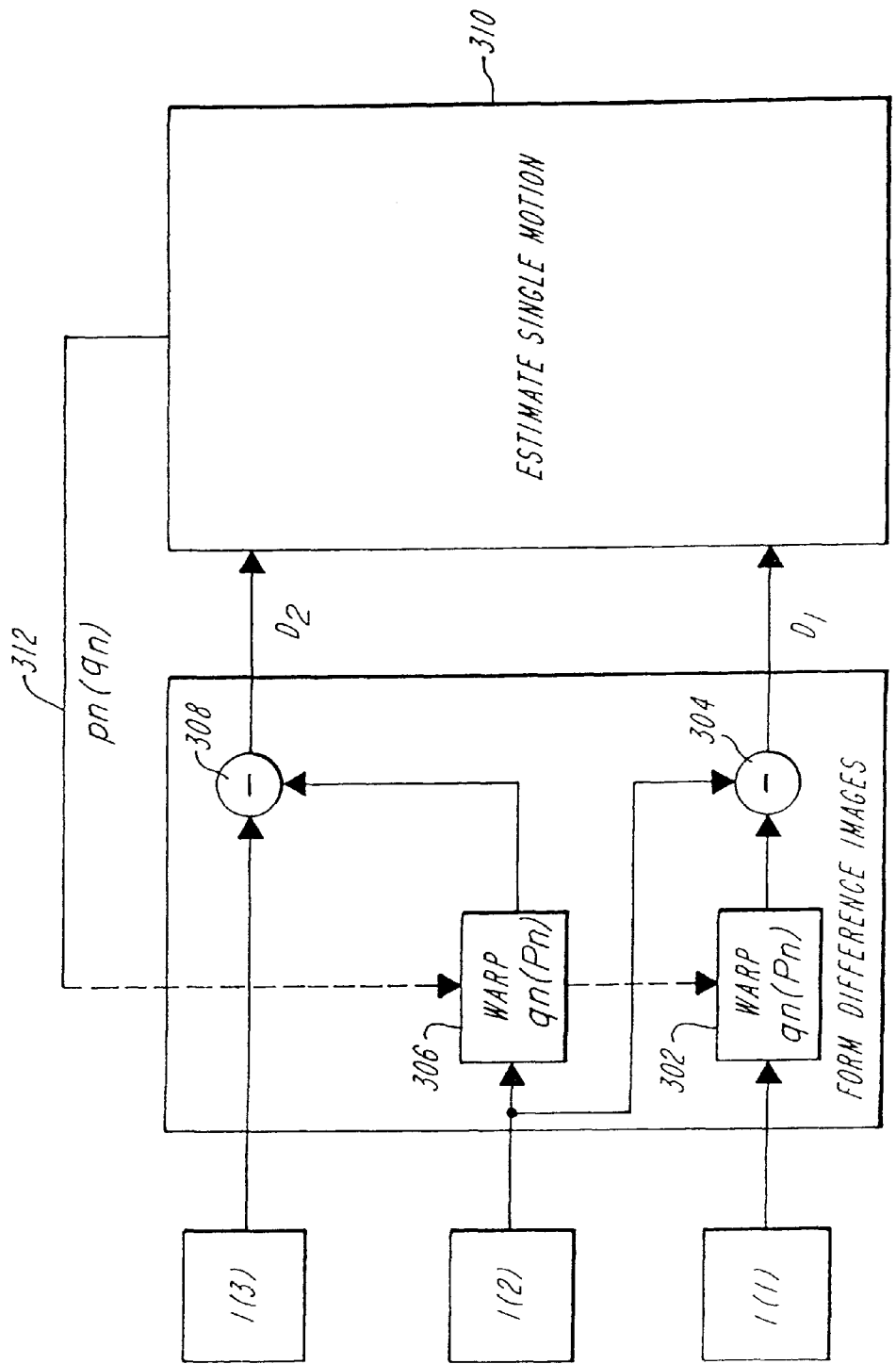
FIG. 8 shows schematically a method for identifying motions of two moving objects in a sequence of frames.

Another method to determine the affine parameters takes advantage of a technique described by Bergen and Burt for tracking two motions and is shown schematically in FIG. 8. The data is evaluated in light of a pair of motions. Here, the image I(x,y,t) is modeled as a combination of two distinct image patterns, P and Q, having independent motions of p and q. The relationship between I and P and Q may be stated as follows:

$$I(x,y,0) = P(x,y) \oplus Q(x,y)$$

and $$I(x,y,t) = P^{tp} \oplus Q^{tq} \quad (11)$$

where the operator $\oplus$ represents an operation to combine the two motions such as addition or multiplication and $P^{tp}$ represents the pattern P transformed by motion p through time t. Bergen and Burt, et al. show that if one of the motion components and the combination rule $\oplus$ are known, it is possible to compute the other motion using the single-component motion technique discussed above, without making any assumptions about the nature of the patterns P and Q. If the motion p is known, only the motion q must be determined and vice versa. The component of the pattern P moving at velocity p can be removed from the image sequence by shifting each image frame by p and subtracting the shifted frame values from the following frame. The resulting difference sequence contains only patterns moving with velocity q.

In a typical case, the combination operation $\oplus$ is addition. Considering the three frames, I(1), I(2) and I(3), of the sequence 200, and assigning the variables $D_1$ and $D_2$ to difference frames generated between those pairs of frames respectively, equation 11 leads to the following:

$$D_1 = I(x,y,2) \times I^p(x,y,1)$$
$$D_1 = (P^{2p} + Q^{2q}) - (P^{2p} + Q^{q+p})$$
$$D_1 = Q^{2q} - Q^{q+p})$$
$$D_1 = (Q^q - Q^p)q$$
$$D_2 = I(x,y,3) - I^p(x,y,2) \quad (12)$$
$$D_2(P^{3p} + Q^{3q}) - (P^{3p} + Q^{2q+p})$$
$$D_2 = Q^{3q - Q2q+p}$$
$$D^2 = Q^{q - Qp)2q}$$

which is shown schematically in FIG. 8 as a warp of I(1) at 302 to transform pattern P through one step, followed by a subtraction of I(2) at 304 to remove the effect of the motion of pattern P. The result is $D_1$, an element of the difference sequence. $D_2$ is formed in the same way by the difference at 308 between I(3) and I(2) warped at 306 by the motion of pattern P.

The modified sequence now consists of a new pattern Qq - QP, moving with a single motion, q.

$$D_n = (Q^q - Q^p)_{nq} \quad (13)$$

Thus, the motion q can be computed between the two difference images $D_1$ and $D_2$ using the single motion estimation technique described above. This is shown schematically at 310 in FIG. 7. Analogously, the motion p can be recovered when q is known. The observed images I(x,y,t) are shifted by q, and a new difference sequence is formed:

$$D_{n=I(x,y,n+}1) - I^q(x,y,n) \quad (14)$$

This sequence is the pattern pp - pq moving with velocity p:

$$D_n = (P^p - P^q)^{np} \quad (15),$$

so, p can be recovered using the single motion estimation.

This shift and subtract procedure removes one moving pattern from the image sequence without regard to, or determining what that pattern is. In practice, neither p nor q is known at the outset. However, both can be recovered by the above technique through iterations, even if only a very rough estimate of either is chosen initially. The iterative procedure repeatedly applies the single motion technique. Beginning with a rough estimate of the parameters that define motion p, an estimate of q is generated and returned at 312 to the warping steps 302, 306. From the estimated q, an improved estimate of p can be achieved and returned at 312 to the warping step 302, 306, and so on. The process converges to accurate estimations rather quickly. With real image sequences, adequate transformations are generated after three to twelve cycles.

To summarize the steps of this portion of the invention:
1. Set an initial estimate for the motion $p_0$ of pattern P.
2. Form the difference images $D_1$ and $D_2$ as in Equation (12), using the most recent estimate of pn.
3. Apply the single motion estimator to $D_1$ and $D_2$ to obtain an estimate of $q_{n+1}$.
4. Form new difference images $D_1$ and $D_2$ using the estimate $q_{n+}1$.
5. Apply the single motion estimator to the new sequence $D_1$ and $D_2$ to obtain a new $P_{n+}2$.
6. Repeat, starting at step 2.

By observing the two sets of affine parameters generated according to this two motion method, it is possible to identify a moving scene, or camera motion. In general, the parameters that relate only to zoom warping change smoothly and only slightly from one frame to the next. The parameters that relate to image motion or camera motion change differently from those due to zoom. These different changes can be observed by inspection.

It is also theoretically possible to automate the identification of scene or camera motion by automatically comparing the affine parameters from one frame pair to the next, and triggering a flag when the changes exceed a preselected level. One possible method is to compare the difference between affine parameters of two frame pairs to the standard deviation of a selected number of previous frame pairs. For instance, for a sequence of 70 frames, it is typical to determine the standard deviation of the last 10 frame pairs.

If both the camera and elements in the scene are moving, more than 2 motions are present and a more robust method for eliminating camera motion is beneficial. A combination of the affine two motion estimation discussed above with masking techniques has been found to provide beneficial results. It may also be beneficial to determine a probability density function of displacement vectors in the image. See generally, Girod, B., Kuo, D., *Direct Estimation of Displacement Histograms*, Proceedings of the Optical Society of America Meeting on Machine Understanding and Machine Vision, Cape Cod, Mass., June 1990. This provides information relating to the number of distinct objects are moving between frames, and what their respective displacement vectors are, by not where the objects are located. Local block matching estimators are used to spatially locate the moving objects. The regions of moving objects are masked out of the calculations and the affine estimation is then computed.

Assuming that the displacement between pairs of frames is small and there is no unexpected camera movement, such as the camera being bumped or rapid change in focal length, the affine parameters should not be very different between frame pairs. After the parameters are determined, as described above, the coefficients are smoothed to remove spurious values.

Once the Y channel data from each frame in sequence 200 has been warped, the affine parameters that have been determined are applied to the other channels, e.g. in phase and quadrature, to provide transformation of a full color rendering.

After the full raster of the warped short focal length frame 201 has been filled, tone scale correction can be undertaken to compensate for changes that affect tone, such as variations in aperture setting from one frame to the next. Starting from the center image, samples of the luminance values are taken around the area where two images abut. A spline is fit to the data and the pixels of the larger image (lower resolution) are changed to those of the smaller image. The tone scale of this corrected image is then used to compare to the next larger warped image, and so on, to the largest image. Alternatively, tone scale can be corrected by iteratively adding a bias to one image in order to minimize the difference between two images.

Figure 5:
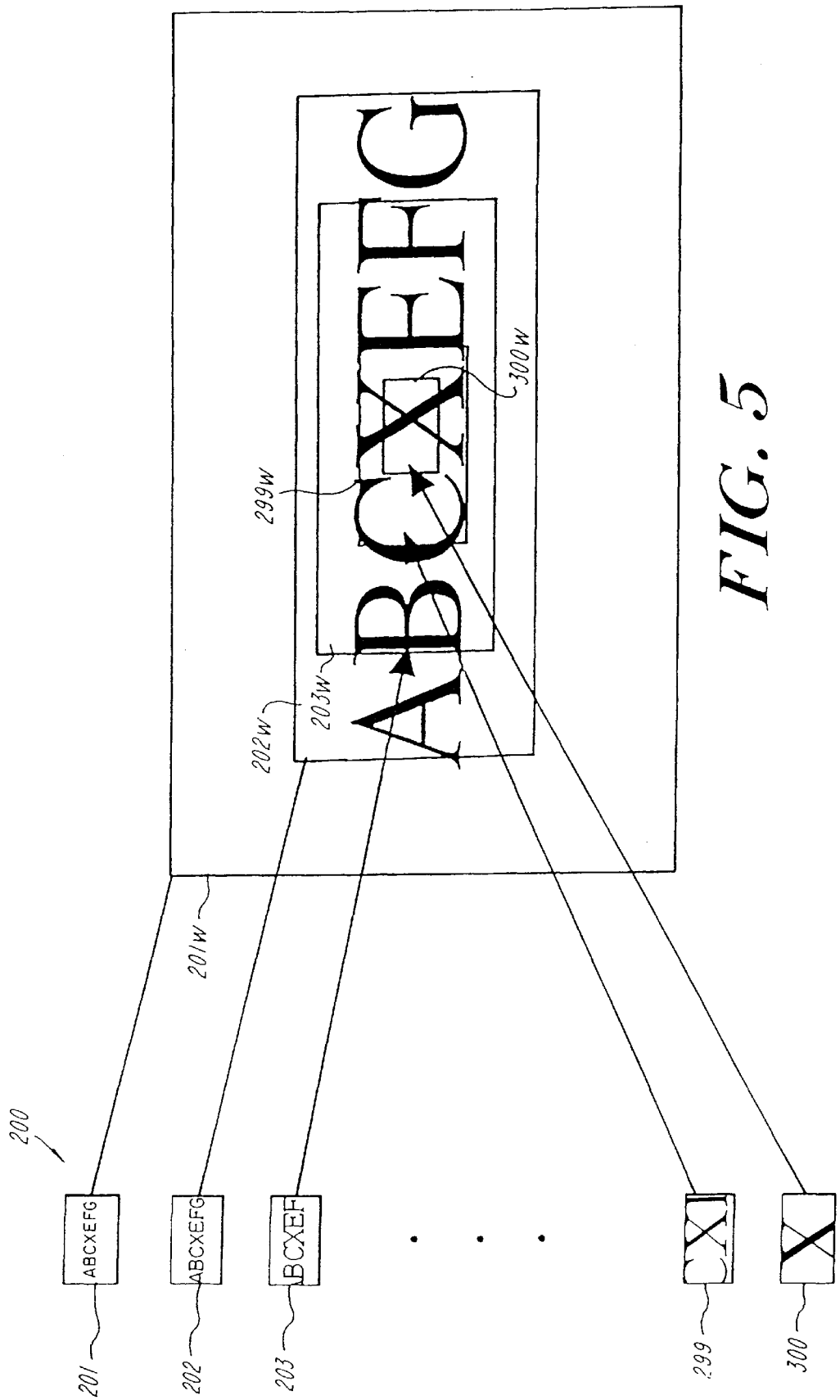
FIG. 5 shows schematically the mapping, or warping of each video image of the sequence shown in FIG. 3 (shown at the left hand side of FIG. 5) into a data space of the same size, that size being the size of the blown-up, lowest resolution frame.

After full color data from each frame in sequence 200 has been warped into the same data space, the data from one frame for each pixel must be combined with the data for all of the other frames. Several techniques are possible. The most rudimentary technique is to select pixel values for the final composite picture from that frame having the highest resolution. As shown in FIG. 5, the frame 299w, which is the warped version of frame 299, will, in the typical case, occupy the center of the composite picture and this frame will be of the highest resolution with respect to the central portion of the image. The information from frame 298 will occupy an annular rectangular area around the center and this information will be of the highest resolution available for this portion. The information from frame 297 will occupy an annular rectangular area of slightly larger axes around the annular region of frame 298w, and so on, with the annular perimeter of the first frame, 201w, occupying the outermost region of the warped figure.

Figure 9:
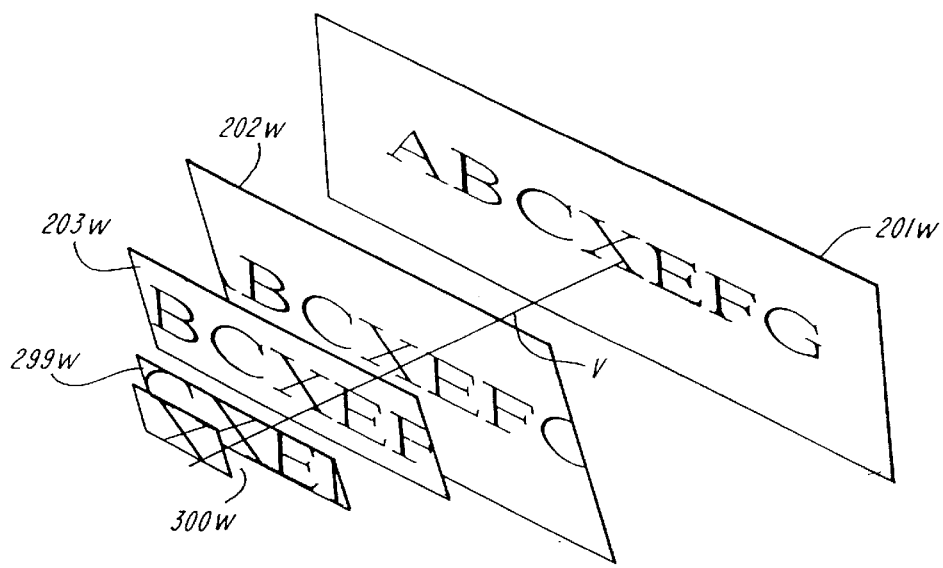
FIG. 9 shows schematically each frame of the sequence, after it has been warped into the same data space, aligned as they will be recomposed into the final rendering. A vector through common points of each frame is shown.

Although the foregoing does produce beneficial results, noticeable edges appear, demarking the boundaries between the regions generated from the various frames. For this reason, for a given pixel, a weighting function is applied all of the warped frames of the sequence, and the median of the weighted values is taken as the value for the pixel. A pixel location is described by a vector V, shown in FIG. 9, which pierces all of the warped frames, 201w–299w at the same location in the image. The weighting function is applied to the image values along the vector V. A typical weighting function is shown graphically in FIG. 10. As can be seen, the weighting function is concave upwards, with the pixel values from the close in zoom shot being afforded the greatest weight, perhaps even 100%. Various weighting functions may be applied, depending on the desired effect. Typically, the frames of higher resolution are weighted more heavily than those of lower resolution.

Figure 10:
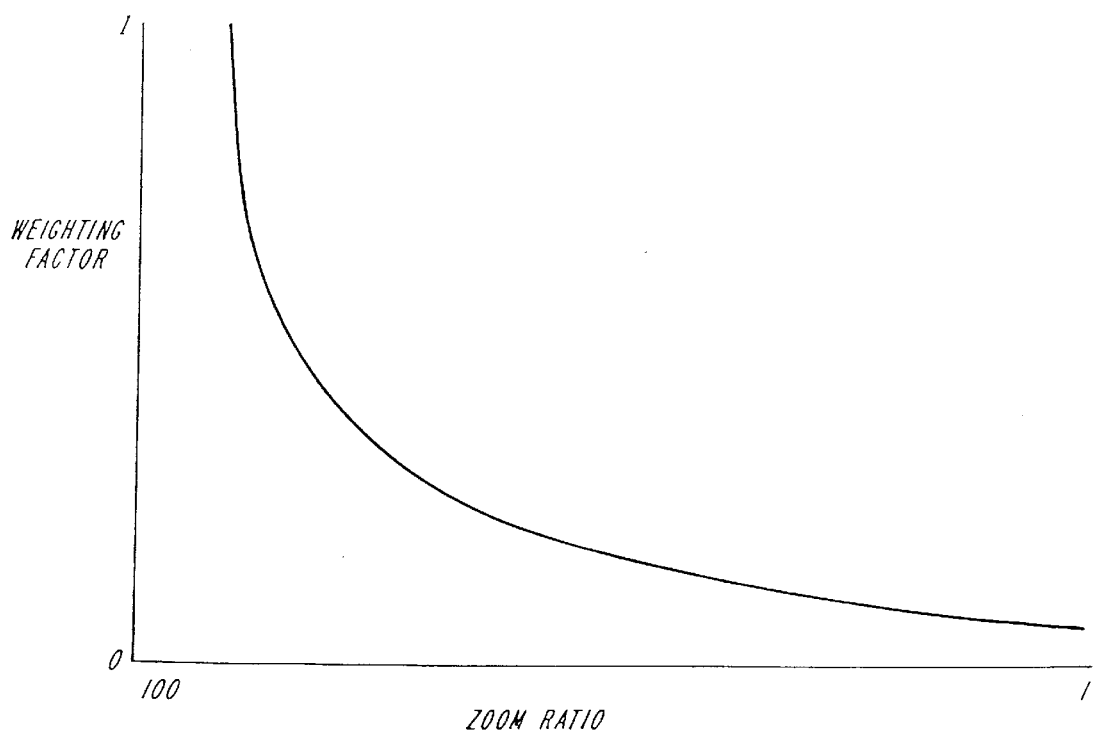
FIG. 10 shows graphically the relation between a weighting factor to be used in composing the final image and the original focal length of the warped frame to which the weighting factor is applied.
Figure 11:
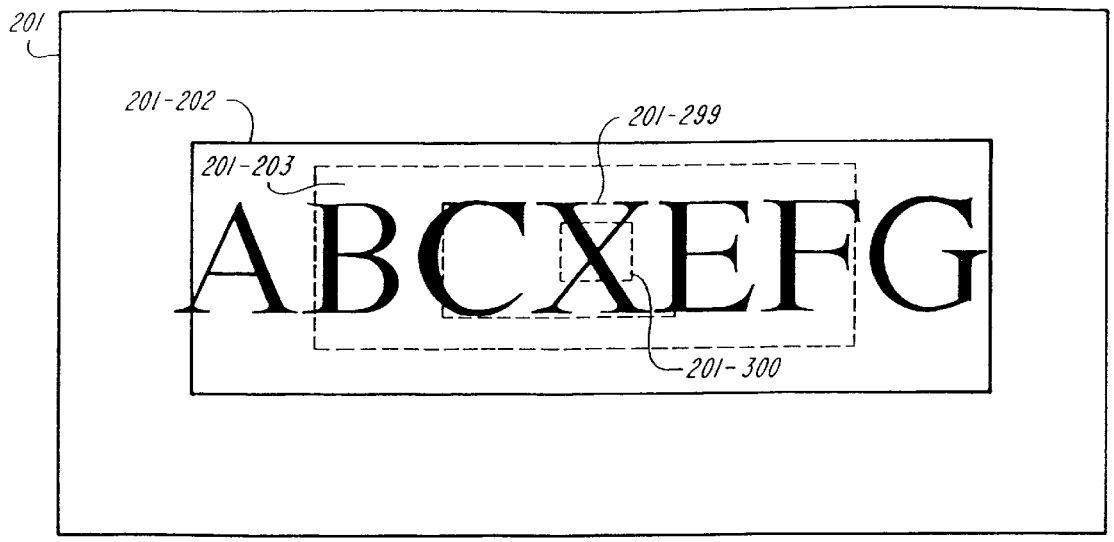
FIG. 11 shows schematically the final, recomposed image and its component parts.
Figure 12:
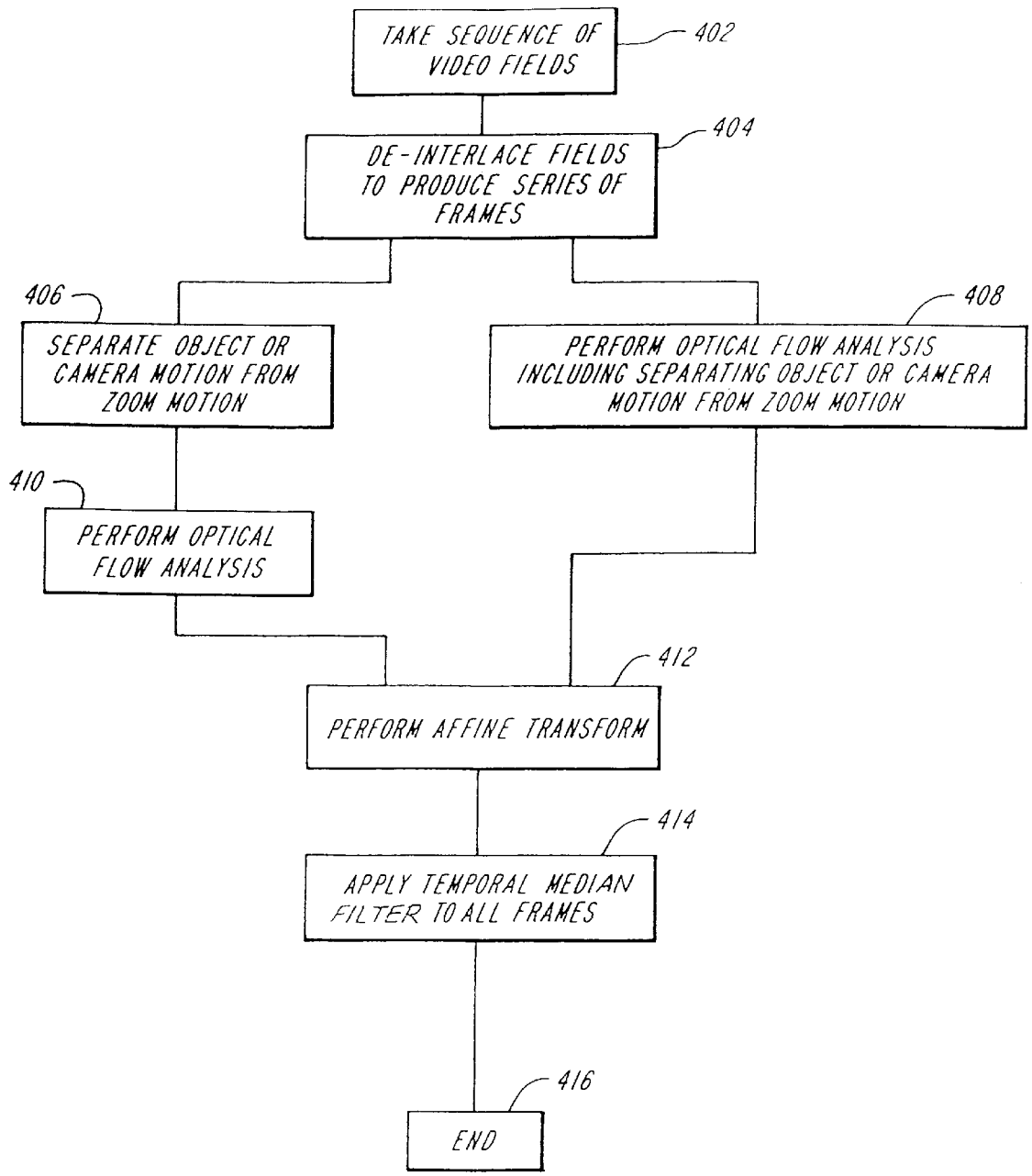
FIG. 12 is a flowchart describing a preferred embodiment of the method of the invention.

The foregoing has described the building blocks of the method of creating a single still image of high resolution, from a sequence of frames of lower resolution, albeit in a somewhat artificial order. FIG. 12 shows the steps of the method, in substantially a preferred order. A sequence of video fields is taken at 402. Thus, signals are generated representing the images as a series of fields. The fields are de-interlaced 404 to produce a series of frames. At this point, alternate paths can be taken. The object or camera motion can be separated from the zoom motion at 406, followed by performance of the optical flow analysis to generate the affine transformation coefficients $a_x$, $b_x$, $c_x$, $a_y$, $b_y$, $c_y$. At 404, it is also possible to branch to a step 408, which combines performance of the optical flow analysis with separating object or camera motion from zoom motion. This branch also produces the coefficients $a_x$, $b_x$, $c_x$, $a_y$, $b_y$, $c_y$. Next, at 412 the affine transformation is applied, to each frame the requisite number of times, so that for each frame, a corresponding frame at the high resolution raster is produced. A temporal median filter, such as is shown in FIG. 10 is applied to all frames at 414, and the signal representing the final composite is formed at 416 by the summation at every pixel location in the high resolution raster the value at that pixel for each warped frame 201w, 202w, etc, filtered by the temporal median filter.

Implementation of the steps, as described above, requires an image store the size of the high resolution output raster for each frame in the original sequence (FIGS. 5 and 6) in order to perform the temporal processing used to generate the high resolution image, since, as described above, this processing occurs after the application of the affine transform. A useful method of generating the composite still, when it is important to optimize memory use, is to refer back to the original image sequence when perfroming the temporal operations.

This is accomplished by applying an affine transform (Equations 9x and 9y) from each position in the relatively high resolution raster back into the smaller raster of the original images. (This affine transform is the inverse of the transform that would be applied as the method is described in connection with Equations 9x and 9y above. Rather than warping all data points from one data space into a series of ever larger data spaces and then combining corresponding data points, all of the data points are identified that would be warped into a specific target location in that larger data space and are then combined.) The temporal operator is applied to the results of this inverse affine transformation. Since the inverse affine transform can be used to reference pixels in the original image sequence during the temporal processing, there is no need for a high resolution image store for each frame in the sequence. Consequently, only as much memory as is needed to store the original image sequence is required to create the hgh resolution image. There is no additional computational overhead in applying the inverse affine transform from the high resolution raster back to the original raster, since the corresponding affine transform from the original raster to the high resolution raster is not necessary.

Figure 13:
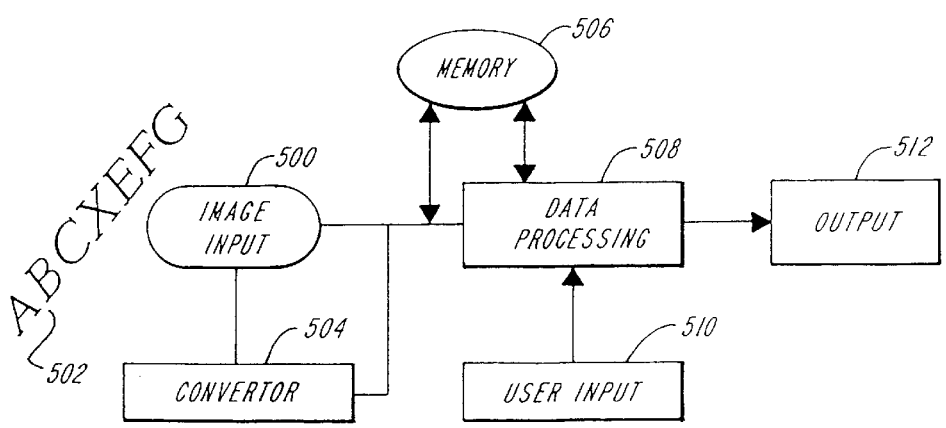
FIG. 13 shows schematically a preferred embodiment of the apparatus of the invention.

A preferred embodiment of the apparatus of the invention is shown schematically in FIG. 13. An input device 500, such as a video camera, is applied to scene 502, taking in light reflected from or transmitted by the scene. The light is converted to electronic signal by the input device or a standard convertor 504. From convertor 504 or input device 500, the data passes either to memory 506 or a data processing unit 508. Memory device 506 is capable of recording the data by fields, and according to any other configurations into which the data is transformed. The data processing unit is typically a properly programmed general purpose digital computer. The operator issues commands to the data processing unit 508 through input device 510, such as a computer keyboard. These commands instruct the computer to perform the steps of the method of the invention discussed above: de-interlacing the fields; identifying two or more moving objects by creating the difference sequences; calculating the affine transformation coefficients; warping all of the frames into the desired data space; combining the data from the warped frames according to the weighted temporal median filter to arrive at a composite picture, etc. The transformed data, at every step, can be recorded onto memory device 506, and can be output on output device 512, which can be a printer, video display, or any other suitable output device known to the art. Alternatively, the data can be transmitted to a remote location for additional manipulation and storage or output.

Figure 14A:
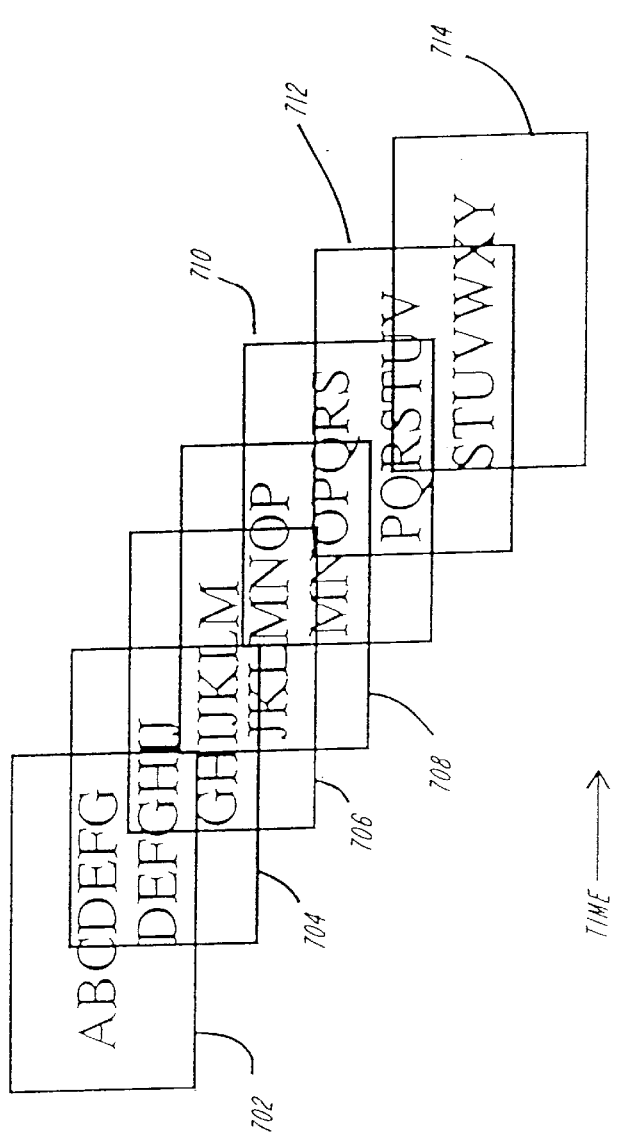
FIG. 14a shows schematically a series of individual image frames taken over different fields of view within a panoramic scene.

Rather than a single still from a zoom, the method may also be used to create a single panoramic still from a series of pan and jib shots. In such a case, all of the frames would be warped into a data space taking up as much space as the entire panoramic scene. There would not be a stack of pictures of various focal lengths stacked on top of each other. Rather, as shown schematically in FIG. 14A, there would be a series of images 702–714, whose edges overlapped. This embodiment of the invention could be used in applications where users are given the opportunity to view a smaller portion of a relatively large panoramic view, that has been composed from a large number of overlapping images. The user is given the opportunity to navigate through the overall panoramic scene. Without the present invention, it would typically be necessary to have a large number of overlapping images, all kept in storage, and to access the pertinent image that most closely matches the portion of the overall scene that the user wishes to examine. This entails a large amount of disk space. Implementation of a panoramic embodiment of the method of the invention permits The many images to be combined, eliminating the redundant portions of overlapping images, and thereby saving on memory. The combination of the images can be done before hand, with the resultant image stored, or it can be done in real time, as the user navigates from one portion of the image to another. The choice would depend on the relative computational and memory assets available to the designer.

Figure 14B:
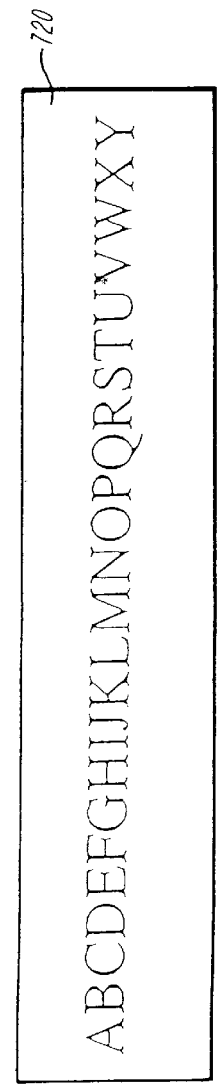

In the embodiment applied to a zoom sequence, a key factor of the warping is to blow up the data from each frame to place the images of the scene in register with each other. It is also an aspect of the zoom application to warp the data so that all images of the scene are aligned with each other. This feature removes motion due to, for instance, camera motion or motion of the subject. In a purely panoramic application, the blow-up feature is only minimally important, and in most cases is not even used. Or rather than not being used, the scale factor is unity, so that after scaling, the image is the same size as before. However, the alignment aspect is very important. If the overall field of view of the panoramic scene is represented as a continuous data space, such as indicated at 720 in FIG. 14B, then each frame takes up a small part of the overall field of view. Unlike in the zoom application, each frame 702–714, in the purely, panoramic application is produced at the same focal length. It is necessary to use the method of the invention to align the data from the frames in the overall data space, so that images in each frame coincide with the same image in another field. For instance, the invention is used to align the letters "DEFG" from image 702 with the same letters from image 704. The method of the invention is applied predominantly at the seams between shots. If the speed of the pan is slow, compared to the frame frequency, the overlap between frames at the seams is quite large.

Thus, each image is converted to a signal representing that image. Each signal is transformed so that it represents the respective image, aligned within a data space designed to represent the entire panoramic image, such as 720. All of the signals are combined according to the method discussed above. Any object or camera motion can be identified, followed by performance of the optical flow analysis to generate the affine transformation coefficients $a_x$, $b_x$, $c_x$, $a_y$, $b_y$, $c_y$. Next, the affine transformation is applied to each frame so that for each frame, a signal representing a corresponding frame aligned to the overall field of view is produced. A temporal median filter, such as is. shown in FIG. 10 is applied to all frames and the signal representing the final composite is formed by the summation at every pixel location in the overall field of view the value at that pixel for each warped frame 702, 704, etc., filtered by the temporal median filter.

When the signals are combined, signal components that represent portions of the image which are not overlapped by any other image, such as the letters "ABC" of image 702, or the letters "WXY" of the image 714, remain unchanged. in their representational character., i.e. in that aspect of the signal component that dictates the shape and intensity of the image. However, they are transformed in the sense that they are correlated to a larger data space, such as 702, than the original, single frame data space to which they were correlated, which is the size of an individual image, such as 702 or 714. and which has no location component relating it to other images In other words, the initial signal component representing the image in frame 702 had no aspect that located the image with respect to an overall field of view. After transformation, the transformed signal, in addition to representing the shapes that make up the letters "ABC," also represents the location of that frame as a specific portion of the larger data space 720, i.e. the leftmost end.

Signal components that represent portions of the image which are overlapped when combined, are also transformed by the steps outlined above. The optical flow analysis is used to determine parameters for an affine transformation, which results in a mapping of the image into a larger, overall panoramic data space. However, not only is the signal transformed with respect to its representation of a location within an overall field of view, but it is also combined with signals from other images, that depict the same part of the overall field of view. Any number of signals representing overlapping images may be combined with respect to certain points in the resulting composite signal and corresponding image. For instance, images 702, 704 and 706 include an image of the letter "D". When the signals representing the three images 702, 704 and 706 are combined, each will contribute to the final composite signal. Application of the temporal median filter, or some other appropriate temporal filter, combines the appropriate signal components from the different signals according to an appropriate weighting factor.

The motion elimination steps of the invention are applied to these signals, to eliminate, or minimize, the effect of any motion in the scene that occurred during the time elapsed between the taking of overlapping images.

It will be evident to one of ordinary skill in the art that, the invention can be applied to more complicated relative motions between the camera and the scene than a simple panoramic motion from one side to the other. Jibs (vertical camera motion) can also be combined using this method, as can any combination of jibs and pans and tilts. The resultant images will have regions of overlap that include various portions of the images, rather than just the side edges, or top and bottom edges.

It is also within the contemplation of the invention to combine the zoom treatment with the panoramic treatment, to obtain greater detail in selected areas of an overall panoramic scene.

It is also possible to use the technique of the invention to merge objects and frames from non-contiguous segments of video.

In addition to the methods of combining multiple images of different fields of view or focal lengths for a composite image of higher resolution or greater field of view than any of the individual images of the original sequence, the present invention also provides a method of enhancing the resolution of an image of a scene or the signal to noise ratio of a signal. The resolution enhancement method (sometimes referred to as "resolution out of time") can be implemented using either a zoom sequence or panoramic sequence alone or in combination. It can also be implemented using a substantially fixed focal length and substantially fixed field of view.

Image processing is generally a noisy procedure. Noise can contaminate the signal in many ways. For instance, obstructions can come between the image capture device and the scene, thereby obscuring detail. Thus, a falling leaf may momentarily obscure a digit on a license plate from view of a still camera. This may be referred to as "obstruction" noise. There may also be details that are so small, that for any given single image, they are beyond the resolution of the recording medium. This may be referred to as "sampling" noise. There may also be noise due to imperfections in the signal transmission system once the image has been converted into an electronic signal. This type of noise may be referred to as "signal transmission" noise. Thus, there are situations where certain detail in an original scene cannot be recovered from a single image capturing the scene at a single moment in time.

In general, in a noisy system, resolution can be enhanced by capturing multiple images of the same scene and combining those images. If only one image capture device is available, the multiple images must be captured at different moments in time. For instance, both obstruction and signal transmission noise can be minimized by capturing multiple images of the same scene over a time period when the scene does not change (with respect to the desired target image) and the image capture device does not move. Considering the example discussed above of an obstruction, such as a falling leaf, the leaf will be present in only one or a minimal number of captured images, depending on the time period between sample images. In the other images, the number on the license plate will be captured.

Application of the techniques identified above for elimination of motion in the scene being captured and combination of detail from a number of different captured images, eliminates the image of the falling leaf, resulting in an image of the license plate number without the obstruction. Similarly, any electronic noise that arises due to signal transmission noise will be eliminated, appearing to the method steps of the invention as motion in the scene.

It will be understood that practice of a pure zoom embodiment of the method of the invention also automatically provides the result that obstruction type noise will be eliminated, because an image of the same portion of a scene is repeatedly captured and signals representing those multiple captured images are generated and treated according to the invention. This is illustrated with reference to FIG. 9, which shows the same element of the scene captured in a number of different frames,. The letter "X" is captured by each of the frames $300w$, $299w$, $203w$, $202w$ and $201w$. Actually, the letter, being in the center of the scene, would be captured by every frame of the sequence. If an obstruction had obscured the letter X for frame $203w$, its substance could be recovered from other frames of the sequence. Obviously, all of the frames are not required to recover the X. However, the more frames there are, the more precisely can the method of the invention distinguish the signal (i.e. the static X) from the noise (i.e. the falling leaf or the electronic aberration.)

To a potentially lesser degree, a purely panoramic embodiment of the method of the invention eliminates obstruction noise and signal transmission noise, because it also involves the combination of multiple signals representing multiple overlapping images. Without the method of the invention, which permits aligning images that capture different fields of view of an overall scene, it would not be possible to combine the various signals to eliminate the noise.

Capturing multiple images of a time invariant scene will not, however, eliminate sampling noise. This is because, if both the scene and the image capture device remain perfectly fixed with respect to each other, small details that fall between the points of the sampling lattice of the image capture device in one image will fall between the points of the sampling lattice in every image. However, if the image capture device is moved relative to the scene so that the desired detail is aligned with the sampling lattice, then that detail will be captured in that image, and will be represented in the signal corresponding to that image. In effect, the number of distinct points in the scene sampled has been increased, some being sampled in a first image, some different ones being sampled in subsequent images. This may be referred to as a shift in the sampling lattice. This enhanced sampling can be exploited by the method of the invention, because its practice permits the combination of signals representing images covering different fields of view of an overall field of view, with an accuracy that is greater than the resolution of any one image.

Thus, when a scene is captured in a plurality of images captured in a panoramic sequence, the relative motion between the scene and the image capture device results in some of the small details being captured in some images, and not being captured in others. Combination of the signals representing the panoramic images, as discussed above, results in a combined image at the points of overlap, that includes more detail or higher resolution than any single image alone.

Similarly, when a scene is captured in a plurality of images captured in a zoom sequence, the relative motion between the scene and the point on the image capture medium where the scene will be captured (i.e. near the edge of the medium in a long focal length image, and nearer to the center in a shorter focal length image) results in a shift in the sampling lattice. Some of the small details are captured in some images and are not captured in others. Combination of the signals representing the zoomed images, as discussed above, results in a combined image at the points of overlap, that includes more detail than any single image alone. Of course, both the panoramic and the zoom aspects of the invention can be combined to enhance the resolution of an image.

It will be evident that if image enhancement is the only goal, and it is not desired to create a combined image from a panoramic or zoom or combination sequence, the method of the invention can be applied to a sequence of images taken at nominally the same focal length over nominally the same field of view. According to this embodiment of the invention, multiple images of the same portion of a scene are captured at nominally the same focal length and nominally the same field of view, and combined according to the techniques discussed above. In order to achieve maximum benefit from the multiple images, it is beneficial to slightly alter either the field of view or the focal length among the various images that make up the sequence. This enables taking advantage of a shift in sampling lattice, as discussed above, so that more points in the original scene are sampled.

Such an implementation of the invention may be used to provide an enhanced resoultion "pause" feature for video playback equipment.

It will be clear to one of ordinary skill in the art, that although the invention has been described above in terms of zooms, pans, and jibs, relative tilts between the image capture device and the scene can also be used with the same beneficial results.

The various embodiments of the invention can be understood generically if a concept of the state of the scene in a space and time coordinate system is adopted. Each image is taken at a certain time. In general, unless more than one image capture device is used, only one image can exist for a distinct time coordinate. Each image also occupies a characteristic expanse of space, depending on the focal length and "aim" or field of view of the image capture device. The generic method of the invention entails the step of capturing a variety of images from different points in the space-time coordinate system relating to the pertinent scene. After the desired sequence of images has been captured, signals, typically electrical signals, are generated that correspond to each of the images of the sequence. A typical next step is to transform each of the signals so that they represent the respective images, each transformed into the same physical space, which encompasses the overall scene from which all of the images were captured. This transformation is typically conducted by applying affine transformations to each of the signals representing the images in the sequence. An optical flow analysis can be used to determine the affine parameters. The transformed signals are combined, using a temporal operator, such as is illustrated in FIG. 10, thus representing the combination in one space time location of a number of different images, occupying the same spatial coordinates, but from different timewise coordinates of the sequence. In the course of the transformation and combining steps, undesirable effects of camera motion, or of motion in the scene can be deleted or minimized, using the motion estimator technique discussed above. A consequence of the combination of the many images, is that the resolution of the final, composite image, is enhanced, relative to the resolution of any individual image of the sequence. Thus, resoultion arises "out of time."

The different points can be of an expanding locus of points around a central portion of the scene, each successively more expansive portion of the scene capturing the image of the scene at a later moment in time, such as by a zoom sequence. (Contracting loci or points may also be subjected to the method of the invention.)

Alternatively, the different points can be of overlapping sets of points of the scene, moving from one general field of view to another, and also moving from one moment in time to another.

Yet another alternative within the generic framework of the invention is to capture a sequence of images of substantially the same locus of points of a scene, at different moments in time. Within this species of the generic invention, it is typically beneficial to slightly change the sampling lattice of the image capturing device, either by changing the field of view or the focal length of the image capture device. A slight jiggling of either aspect will provide the desired result.

Of course, combinations of all three of these species, in any degree, are possible and within the scope of the invention. Generating a resulting signal representing an image that takes information from each image of the sequence, and combines that information into a coherent combination image is made possible by the aspect of the invention of mapping each of the images into a common spatial data space, for instance by use of the affine transformation, enhanced with the motion elimination techniques discussed. By providing a common data space for information from each of the images, the information from each can be combined using a suitable temporal operator, to produce an image that includes valuable information from all of the space-time possibilities that the evolving scene exhibited.

While the examples have sometimes been discussed in the context of first scaling all of the images into a common data space, as has been mentioned above, although this may be the method that is conceptually easiest to explain, it is also possible, and sometimes beneficial, to perform the temporal combining operation on the original image sequence by applying the inverse of the affine transform (equations 9x and 9y) from each position of the final overall scene back into the typically smaller data spaces (rasters) of the original images in the sequence. This technique can be applied regardless of whether zooms, pans, jibs,, tilts, or none of the foregoing are used, either alone or in any combination.

It will be understood that, as used in the attached claims, the phrase "align to a common field of view"or similar phrases necessarily entails a scaling of the images so that they are all of a common focal length. Otherwise, it makes no sense to attempt to align images of disparate focal lengths to a common field of view.

While the invention has been described in the context of data captured by a video camera, it will be understood by one of ordinary skill in the art that the method of the invention can be applied to data representing a digitized image, however that digitized image has been captured. For instance, a series of still photos taken at different focal lengths can be combined in the manner described to form a single image having enhanced detail in certain areas.

Similarly, a collection of still photos depicting various locations within a panoramic space can be combined in accordance with the invention to create a panoramic image, with various portions of the image being recoverable and showing very little, if any, artifact of the origin of the panoramic image in a collection of separate still images of common focal length but different field of view.

The foregoing description should be considered to be illustrative and not limiting in any sense. Rather than video, any recording technique that takes a sequence of still images can be used. If the recording technique does not generate pixel values, the data generated by the recording medium is beneficially converted to a pixel or similarly oriented data space according to methods well known in the art. Various techniques for separating the motion of the camera or in the scene from the zoom motion are applicable, in addition to the techniques explained herein. Further, it is not necessary to use the Gaussian pyramid steps to compute the affine transformation coefficients. That computation can be performed in other ways, such as on the full high resolution frames.

The invention should be considered in light of the foregoing specification to include all embodiments identified by the claims below, as well as reasonable equivalents thereof.

Having described the invention, what is claimed is:

1. A method for generating a signal corresponding to a still image of a physical situation. comprising the steps of:
   a. using electromagnetic radiation, capturing a plurality of images of said situation, each of said plurality having been produced covering a distinct field of view, said fields of view differing from each other and being members of an overall field of view, each field of view overlapping at least one other field of view, each pair of overlapping images of said plurality sharing an overlap region that corresponds to the same portion of said situation, and said overall field of view corresponding to a greater extent of said situation than any single image of said plurality;

b. generating, for each of an overlapping pair of said plurality of images, an electromagnetic signal representing said image, each signal designated an overlap signal;

c. without reference to the locations of features relative to said overall field of view or said physical situation, transforming each overlap signal so that it represents the respective image aligned to said overall field of view, said transformation being conducted by the steps of, for each said overlap signal:
   i. applying to said overlap signal at least one affine transformation; and
   ii. generating a signal that represents said transformed overlap signal; and d. combining each of said transformed overlap signals into a resultant signal that represents the combination of each of said aligned images into a single image of said situation of said overall field of view.

2. A method for generating a signal representing a still image of a physical situation comprising the steps of:
   a. establishing a plurality of different space time sampling lattices;
   b. using electromagnetic radiation, capturing a plurality of images, each of said plurality having been captured at a distinct and different space time coordinate with a different one of said plurality of different space time sampling lattices;
   c. generating, for each of said images, an electromagnetic signal representative of said image;
   d. transforming each signal so that it represents the respective image, aligned to a common field of view; and
   e. combining each of said transformed signals into a resultant signal that represents the combination of each of said images into a single image of a common field of view by:
      i. automatically identifying portions of each of said images that relate to an object that moves in said physical situation, relative to other objects in said physical situation, from image to image; and
      ii. automatically eliminating said portions of each of said images that relate to said moving object, such that it does not appear in a combination image represented by said resultant signal.

3. A method for generating a signal representing a still image of a physical situation comprising the steps of:
   a. establishing a plurality of different space time sampling lattices;
   b. using electromagnetic radiation, capturing a plurality of images, each of said plurality having been captured at a distinct and different space time coordinate with a different one of said plurality of different space time sampling lattices;
   c. generating, for each of said images, an electromagnetic signal representative of said image;
   d. transforming each signal so that it represents the respective image, aligned to a common field of view; and
   e. combining each of said transformed signals into a resultant signal that represents the combination of each of said images into a single image of a common field of view by:
      i. automatically identifying portions of each of said images that relate to a moving object in said physical situation that are move, relative to other objects in said physical situation, from image to image; and
      ii. automatically emphasizing said portions of each of said images that relate to said moving object, such that more than a single instance of said moving object appears in a combination image represented by said resultant signal.

* * * * *